(12) United States Patent
Lan

(10) Patent No.: US 7,643,199 B2
(45) Date of Patent: Jan. 5, 2010

(54) HIGH APERTURE-RATIO TOP-REFLECTIVE AM-IMOD DISPLAYS

(75) Inventor: Je-Hsiung Lan, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 43 days.

(21) Appl. No.: 11/765,276

(22) Filed: Jun. 19, 2007

(65) Prior Publication Data

US 2008/0316566 A1    Dec. 25, 2008

(51) Int. Cl.
*G02F 1/03* (2006.01)
*G02B 26/00* (2006.01)

(52) U.S. Cl. .................. 359/247; 359/290; 359/295

(58) Field of Classification Search ............ 359/247, 359/245, 301–303, 260–261, 298, 317–318, 359/577, 290–292, 223–225, 262–263, 295, 359/198
See application file for complete search history.

(56) References Cited

U.S. PATENT DOCUMENTS

| | | |
|---|---|---|
| 3,728,030 A | 4/1973 | Hawes |
| 3,955,190 A | 5/1976 | Teraishi |
| 4,403,248 A | 9/1983 | te Velde |
| 4,441,791 A | 4/1984 | Hornbeck |
| 4,786,128 A | 11/1988 | Birnbach |
| 4,859,060 A | 8/1989 | Katagiri et al. |
| 4,954,789 A | 9/1990 | Sampsell |
| 4,956,619 A | 9/1990 | Hornbeck |
| 4,982,184 A | 1/1991 | Kirkwood |
| 5,022,745 A | 6/1991 | Zahowski et al. |
| 5,028,939 A | 7/1991 | Hornbeck et al. |
| 5,091,983 A | 2/1992 | Lukosz |
| 5,096,279 A | 3/1992 | Hornbeck et al. |
| 5,315,370 A | 5/1994 | Bulow |
| 5,381,232 A | 1/1995 | Van Wijk |
| 5,471,341 A | 11/1995 | Warde et al. |
| 5,526,172 A | 6/1996 | Kanack |
| 5,559,358 A | 9/1996 | Burns et al. |
| 5,636,052 A | 6/1997 | Arney et al. |
| 5,646,729 A | 7/1997 | Koskinen et al. |
| 5,646,768 A | 7/1997 | Kaeriyama |

(Continued)

FOREIGN PATENT DOCUMENTS

EP    1 122 577    8/2001

(Continued)

OTHER PUBLICATIONS

Feenstra et al., Electrowetting displays, Liquivista BV, 16 pp., Jan. 2006.

(Continued)

*Primary Examiner*—Scott J Sugarman
*Assistant Examiner*—Dawayne A Pinkney
(74) *Attorney, Agent, or Firm*—Knobbe Martens Olson & Bear LLP

(57) ABSTRACT

High-aperture-ratio devices comprise active-matrix elements and interferometric modulators and methods of making thereof. The active-matrix element may be positioned behind the interferometric modulator with respect to incident light. In some embodiments, components of the active-matrix element may be formed on a first substrate, while components of the interferometric modulator may be formed on a second substrate, and the substrates may then be attached.

37 Claims, 27 Drawing Sheets

U.S. PATENT DOCUMENTS

| | | |
|---|---|---|
| 5,661,592 A | 8/1997 | Bornstein et al. |
| 5,665,997 A | 9/1997 | Weaver et al. |
| 5,710,656 A | 1/1998 | Goosen |
| 5,786,927 A | 7/1998 | Greywall et al. |
| 5,808,781 A | 9/1998 | Arney et al. |
| 5,818,095 A | 10/1998 | Sampsell |
| 5,825,528 A | 10/1998 | Goosen |
| 5,838,484 A | 11/1998 | Goossen et al. |
| 5,867,302 A | 2/1999 | Fleming |
| 6,028,689 A | 2/2000 | Michalicek et al. |
| 6,040,840 A | 3/2000 | Koshiba et al. |
| 6,040,937 A | 3/2000 | Miles |
| 6,055,090 A | 4/2000 | Miles |
| 6,262,697 B1 | 7/2001 | Stephenson |
| 6,327,071 B1 | 12/2001 | Kimura |
| 6,356,378 B1 | 3/2002 | Huibers |
| 6,384,952 B1 | 5/2002 | Clark et al. |
| 6,433,917 B1 | 8/2002 | Mei et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,794,119 B2 | 9/2004 | Miles |
| 6,841,081 B2 | 1/2005 | Chang et al. |
| 6,844,959 B2 | 1/2005 | Huibers et al. |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,980,350 B2 | 12/2005 | Hung et al. |
| 6,983,820 B2 | 1/2006 | Boast et al. |
| 7,006,272 B2 | 2/2006 | Tsai |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,184,202 B2 | 2/2007 | Miles et al. |
| 7,198,873 B2 | 4/2007 | Geh et al. |
| 7,221,495 B2 | 5/2007 | Miles et al. |
| 7,236,284 B2 | 6/2007 | Miles |
| 7,321,457 B2 | 1/2008 | Heald |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0015215 A1 | 2/2002 | Miles |
| 2002/0024711 A1 | 2/2002 | Miles |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kurdle et al. |
| 2002/0149828 A1 | 10/2002 | Miles |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072070 A1 | 4/2003 | Miles |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0058532 A1 | 3/2004 | Miles et al. |
| 2004/0075967 A1 | 4/2004 | Lynch et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0207897 A1 | 10/2004 | Lin |
| 2004/0209195 A1 | 10/2004 | Lin |
| 2004/0217919 A1 | 11/2004 | Pichi et al. |
| 2004/0218251 A1 | 11/2004 | Piehl et al. |
| 2004/0240032 A1 | 12/2004 | Miles |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0078348 A1 | 4/2005 | Lin |
| 2005/0168849 A1 | 8/2005 | Lin |
| 2005/0179378 A1 | 8/2005 | Oooka et al. |
| 2005/0195462 A1 | 9/2005 | Lin |
| 2005/0249966 A1 | 11/2005 | Tung et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066935 A1 | 3/2006 | Cummings et al. |
| 2006/0066936 A1 | 3/2006 | Chui et al. |
| 2006/0067643 A1 | 3/2006 | Chui |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0077507 A1 | 4/2006 | Chui et al. |
| 2006/0077508 A1* | 4/2006 | Chui et al. .................. 359/245 |
| 2006/0077515 A1 | 4/2006 | Cummings |
| 2006/0077516 A1 | 4/2006 | Kothari |
| 2006/0079048 A1 | 4/2006 | Sampsell |
| 2006/0220160 A1 | 10/2006 | Miles |
| 2006/0262380 A1 | 11/2006 | Miles |
| 2006/0268388 A1 | 11/2006 | Miles |
| 2006/0274074 A1 | 12/2006 | Miles |
| 2006/0274398 A1 | 12/2006 | Chou |
| 2007/0040777 A1 | 2/2007 | Cummings |
| 2007/0086078 A1 | 4/2007 | Hagood et al. |
| 2007/0121118 A1 | 5/2007 | Gally et al. |
| 2007/0177247 A1 | 8/2007 | Miles |
| 2007/0189654 A1 | 8/2007 | Lasiter |

| | | | |
|---|---|---|---|
| 2007/0194630 A1 | 8/2007 | Mingard et al. | |
| 2007/0216987 A1* | 9/2007 | Hagood et al. | ............. 359/298 |
| 2007/0279729 A1 | 12/2007 | Kothari et al. | |
| 2008/0003710 A1 | 1/2008 | Kogut et al. | |
| 2008/0013144 A1 | 1/2008 | Chui et al. | |
| 2008/0013145 A1 | 1/2008 | Chui et al. | |
| 2008/0013154 A1 | 1/2008 | Chui | |
| 2008/0037093 A1 | 2/2008 | Miles | |
| 2008/0055705 A1 | 3/2008 | Kothari | |
| 2008/0055706 A1 | 3/2008 | Chui et al. | |
| 2008/0055707 A1 | 3/2008 | Kogut et al. | |
| 2008/0080043 A1 | 4/2008 | Chui et al. | |
| 2008/0088904 A1 | 4/2008 | Miles | |
| 2008/0088910 A1 | 4/2008 | Miles | |
| 2008/0088911 A1 | 4/2008 | Miles | |
| 2008/0088912 A1 | 4/2008 | Miles | |
| 2008/0094690 A1 | 4/2008 | Luo et al. | |
| 2008/0106782 A1 | 5/2008 | Miles | |
| 2008/0110855 A1 | 5/2008 | Cummings | |
| 2008/0112035 A1 | 5/2008 | Cummings | |
| 2008/0112036 A1 | 5/2008 | Cummings | |
| 2008/0186581 A1 | 8/2008 | Bita et al. | |
| 2008/0239455 A1 | 10/2008 | Kogut et al. | |
| 2008/0247028 A1 | 10/2008 | Chui et al. | |
| 2008/0278787 A1 | 11/2008 | Sasagawa | |
| 2008/0278788 A1 | 11/2008 | Sasagawa | |

FOREIGN PATENT DOCUMENTS

| | | |
|---|---|---|
| EP | 1 275 997 | 1/2003 |
| EP | 1 473 581 | 11/2004 |
| JP | 11211999 | 8/1999 |
| JP | 2001-221913 | 8/2001 |
| JP | 2002-062490 | 2/2002 |
| JP | 2002062493 | 2/2002 |
| JP | 2002-221678 | 8/2002 |
| JP | 2003-340795 | 2/2003 |
| JP | 2004-212638 | 7/2004 |
| JP | 2004-212680 | 7/2004 |
| JP | 2005 279831 | 10/2005 |
| WO | WO 99/52006 | 10/1999 |

OTHER PUBLICATIONS

Lezec, Submicrometer dimple array based interference color field displays and sensors, Nano Lett. 7(2):329-333, Dec. 23, 2006.

U.S. Appl. No. 11/331,705, Lasiter.

Conner, "Hybrid Color Display Using Optical Interference Filter Array," SID Digest, pp. 577-580 (1993).

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. Conf. 6, Jun. 24, 1991, pp. 372-375.

Miles, Mark, W., "A New Reflective FPD Technology Using Interferometric Modulation", The Proceedings of the Society for Information Display (May 11-16, 1997).

Taii et al., "A transparent sheet display by plastic MEMS," Journal of the SID 14(8):735-741, 2006.

Pape et al., Characteristics of the deformable mirror device for optical information processing, Optical Engineering, 22(6):676-681, Nov.-Dec. 1983.

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

* cited by examiner

|  | Column Output Signals | |
|---|---|---|
| | $+V_{bias}$ | $-V_{bias}$ |
| Row Output Signals 0 | Stable | Stable |
| $+\Delta V$ | Relax | Actuate |
| $-\Delta V$ | Actuate | Relax |

HIGH APERTURE-RATIO TOP-REFLECTIVE AM-IMOD DISPLAYS

BACKGROUND

1. Field of the Invention

Embodiments described herein include high-aperture-ratio devices comprising active-matrix elements and interferometric modulators and methods of making thereof.

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In some embodiments, an interferometric display device is provided, wherein the device comprises at least one interferometric modulator configured to modulate incident light; and at least one control element coupled to the interferometric modulator, the at least one control element located behind the at least one interferometric modulator with respect to the incident light. The at least one interferometric modulator may be formed on a first substrate and the at least one control element is formed on a second substrate; and the device may further comprise at least one support configured to define a spacing between the first substrate and the second substrate. The first substrate may include glass, and the second substrate may include silicon. The at least one interferometric modulator may comprise a partially light-reflecting electrode; a movable electrode defining an interferometric cavity with the first electrode; and at least one first support between the partially light-reflecting electrode and the movable electrode. The at least one control element may comprise a transistor and/or an electronic switching element. The device may further comprise at least one support between the at least one control element and the at least one interferometric modulator. The at least one support may support the at least one control element behind the at least one interferometric modulator and may comprise a flexible component. An electrical connection between the at least one interferometric modulator and the at least one control element may further be provided. In some embodiments, the at least one interferometric modulator is characterized by at least two pixel states and wherein the at least one control element at least partially controls the pixel state of the at least one interferometric modulator. The device may further comprise at least one color filter configured to modify a color of light emitted from the at least one interferometric modulator. In some embodiments, at least one second interferometric modulator is provided and is configured to selectively modulate incident light, wherein the at least one interferometric modulator and the at least one second interferometric modulator are formed on a first substrate, the first substrate comprising a substantially transparent layer that serves as an electrode in common to the at least one interferometric modulator and the at least one second interferometric modulator. The transparent layer may be a contiguous non-patterned layer.

The device may further comprise a display comprising the interferometric display device; a processor that is configured to communicate with said display, said processor being configured to process image data; and a memory device that is configured to communicate with said processor. The device may further comprise a driver circuit configured to send at least one signal to the display, a controller configured to send at least a portion of the image data to the driver circuit, an image source module configured to send said image data to said processor, and/or an input device configured to receive input data and to communicate said input data to said processor. The image source module may include at least one of a receiver, transceiver, and transmitter.

In some embodiments, a method of manufacturing a display device is provided, wherein the method comprises forming a partially light-reflecting electrode over a first substrate; forming a movable electrode over the partially light-reflecting electrode to result in an interferometric cavity; positioning a control element behind the movable electrode with respect to the partially light-reflecting electrode; and electrically connecting the control element to at least one of the partially light-reflecting electrode and the movable electrode. The control element may comprise a transistor. Electrically connecting may comprise forming a via in a substrate comprising the control element; and forming an electrical connection in the via, the electrical connection coupling the control element and the movable electrode. The method may further include operatively attaching the control element to the first substrate. The control element may be formed over a second substrate, further comprising forming an adhesive layer that operatively connects the first substrate to the second substrate, and the adhesive layer may comprise epoxy glue. In some embodiments, the method further comprises forming a cavity between the partially light-reflecting electrode and the movable electrode, which may comprise removing a sacrificial layer between the partially light-reflecting and movable electrodes and/or supporting the movable electrode with supports over the partially light-reflecting electrode. The method may further include forming at least one support between the partially light-reflecting electrode and the control element, and the at least one support may be formed between the movable electrode and the control element and may comprise a flexible component. In some embodiments, a microelectromechanical (MEMS) device fabricated by a method described herein is provided.

In some embodiments, a device is provided, the device comprising means for interferometrically modulating incident light; and means for actively controlling the means for interferometrically modulating incident light, wherein the means for actively controlling is positioned behind the means for interferometrically modulating with respect to the incident light. The means for actively controlling may comprise a transistor. The means for actively controlling may comprise a means for applying a voltage to an electrode of the means for interferometrically modulating incident light.

In some embodiments, a method is provided, the method comprising positioning an active matrix element behind an interferometric modulator with respect to light incident upon the interferometric modulator; connecting the active matrix element to the interferometric modulator; and at least partially controlling the optical response of an interferometric modulator with the active matrix element. The positioning the active matrix element behind the interferometric modulator may comprise forming at least a part of an active matrix element over a first substrate; forming at least a part of an interferometric modulator over a second substrate; positioning the first substrate behind the second substrate; and attaching the first substrate to the second substrate. The active matrix element may comprise a transistor.

DETAILED DESCRIPTION OF THE PREFERRED EMBODIMENT

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Pixels of an interferometric modulator display, as described below, can be in a "bright" or "dark" state. In order to achieve levels of grey, it is necessary to employ one or more of temporal and spatial modulation. The temporal modulation requires a high refresh rate and therefore results in large power consumption. Approaches to reduce the power consumption of high-refresh-rate displays utilizing passive-matrix elements can be achieved by introducing active-matrix elements. However, devices in which the interferometric modulators are adjacent to the active-matrix elements are characterized by a decreased pixel aperture ratio (or fill factor). Spatial modulation requires a large number of sub-pixels, such that low pixel aperture ratios can reduce the effectiveness in utilizing spatial modulation to achieve levels of grey. Therefore, there is a need for interferometric display devices that include active-matrix elements but achieve a high pixel aperture ratio.

Figure 1:
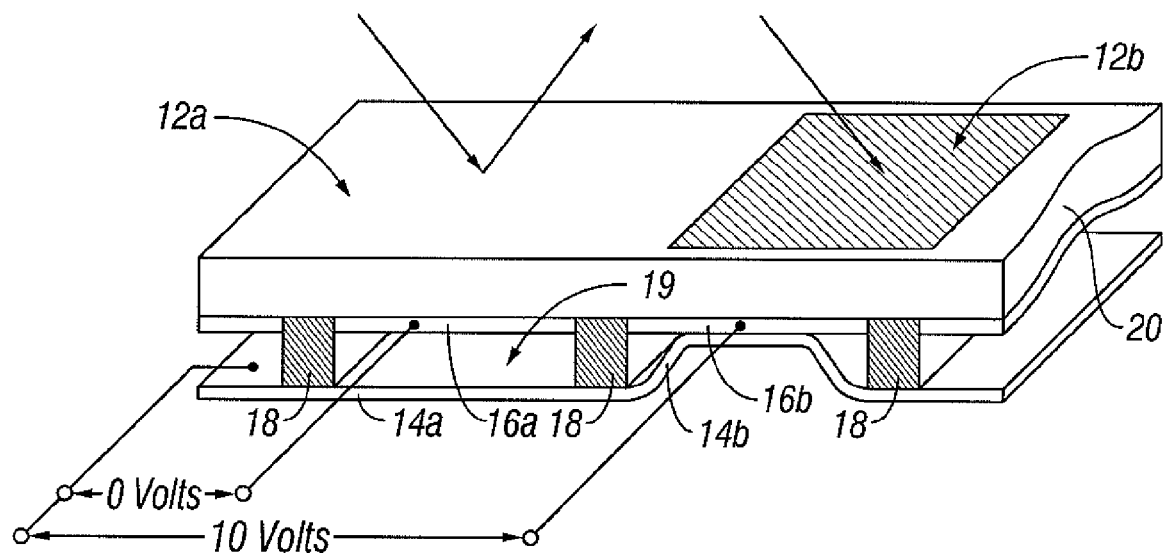
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
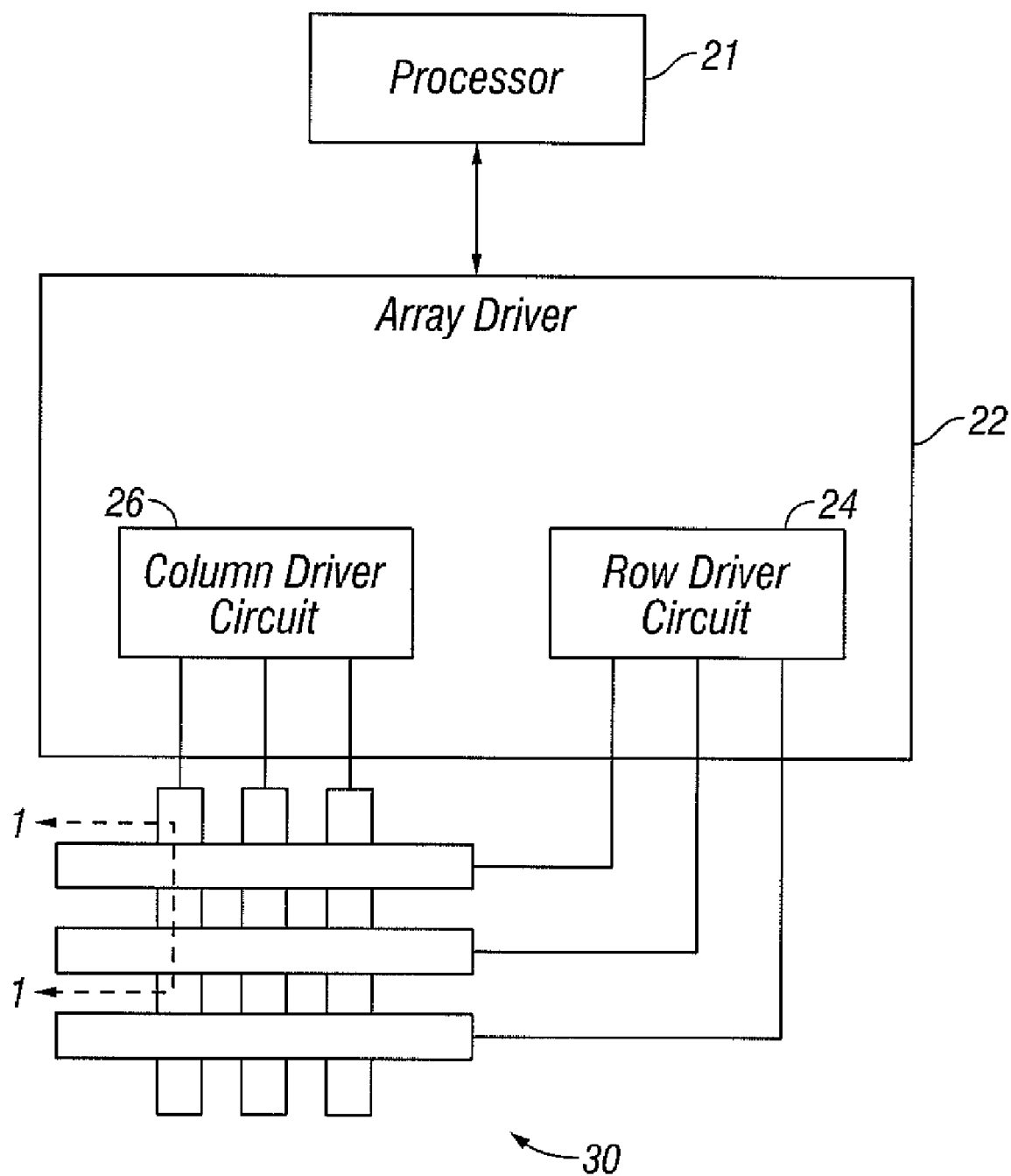
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second.

Figures 3, 4:
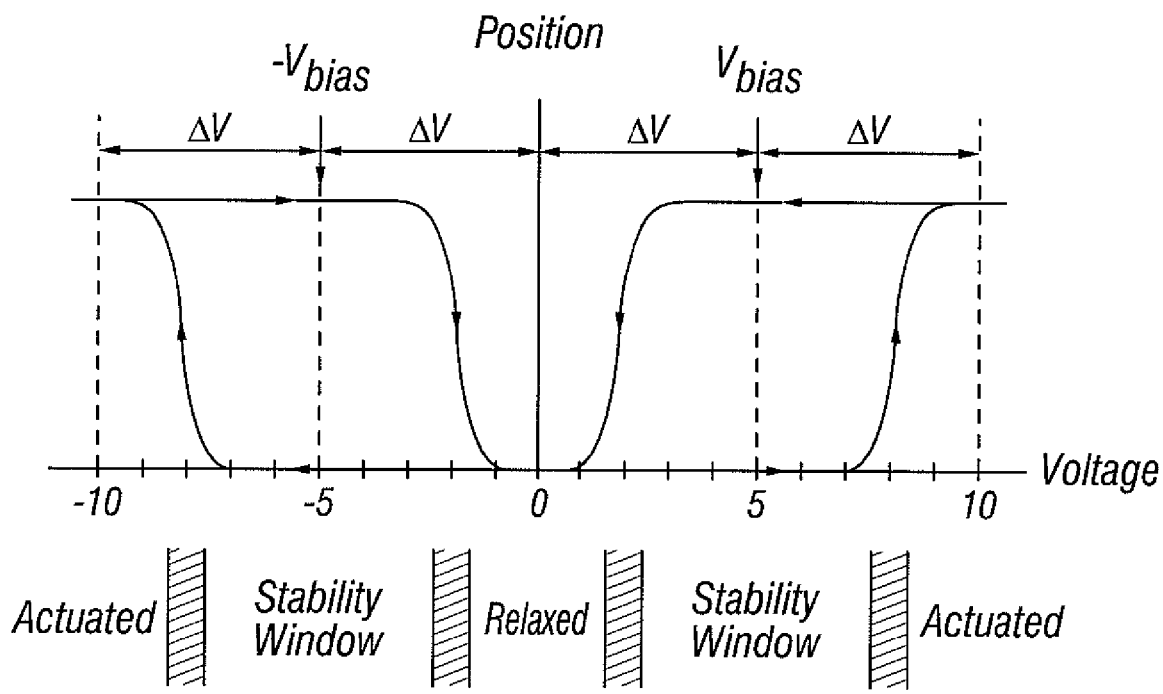
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
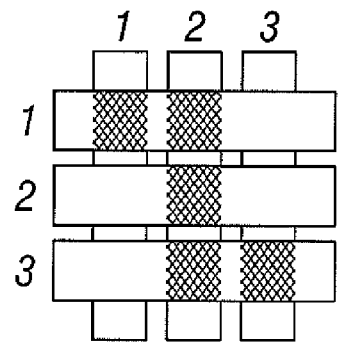
FIG. 5A illustrates one exemplary frame of display data in the 3×3 interferometric modulator display of FIG. 2.
Figure 5B:
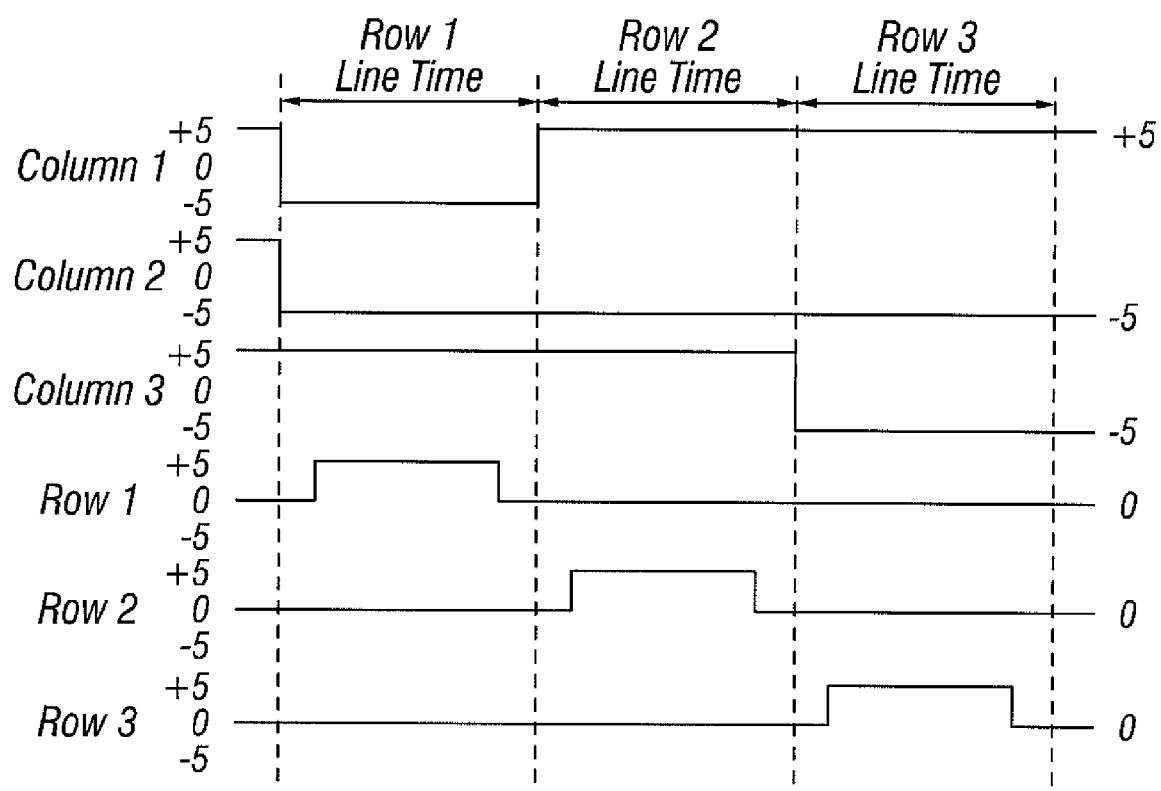
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
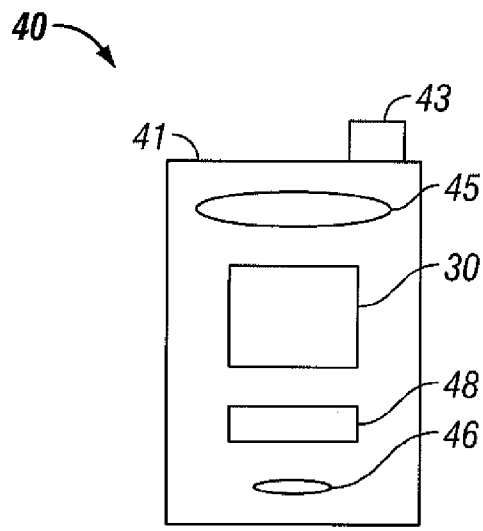
FIGS. 6A and 6B are system block diagrams illustrating an embodiment of a visual display device comprising a plurality of interferometric modulators.
Figure 6B:
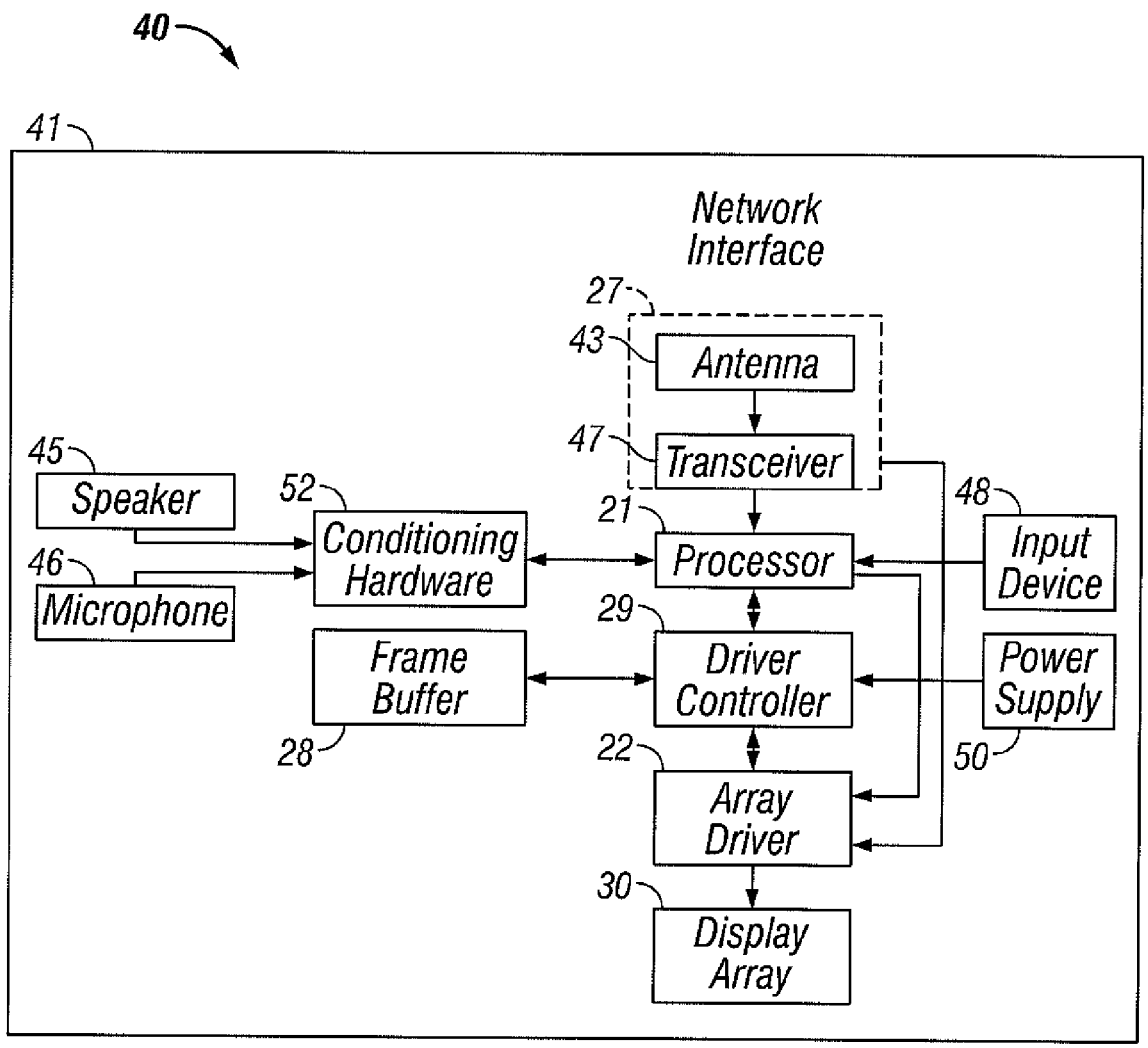

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RE signals according to the IEEE 802.11 standard, including IEEE 802.11(a), (b), or (g). In another embodiment, the antenna transmits and receives RE signals according to the BLUE-TOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
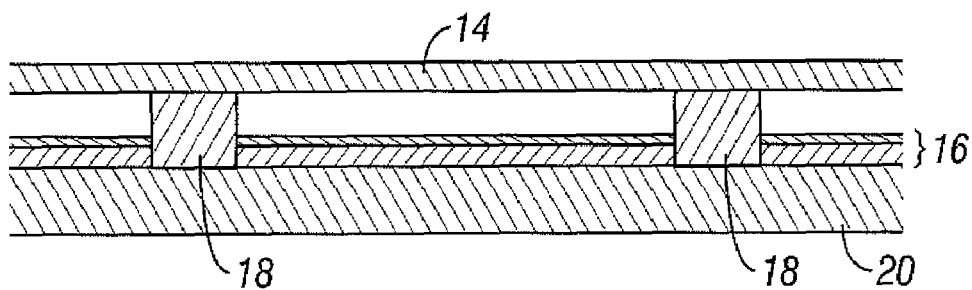
FIG. 7A is a cross section of the device of FIG. 1.
Figure 7B:
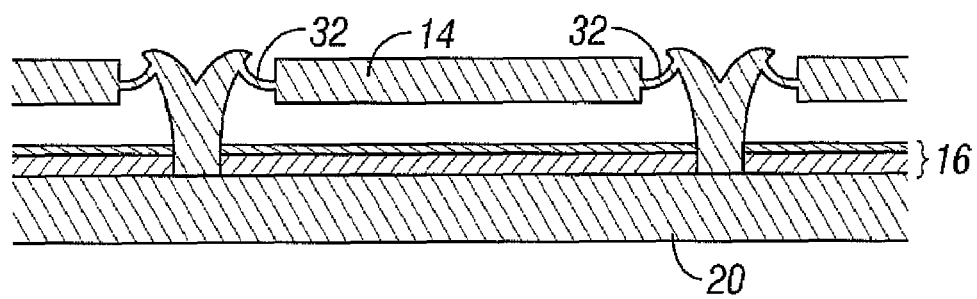
FIG. 7B is a cross section of an alternative embodiment of an interferometric modulator.
Figure 7C:
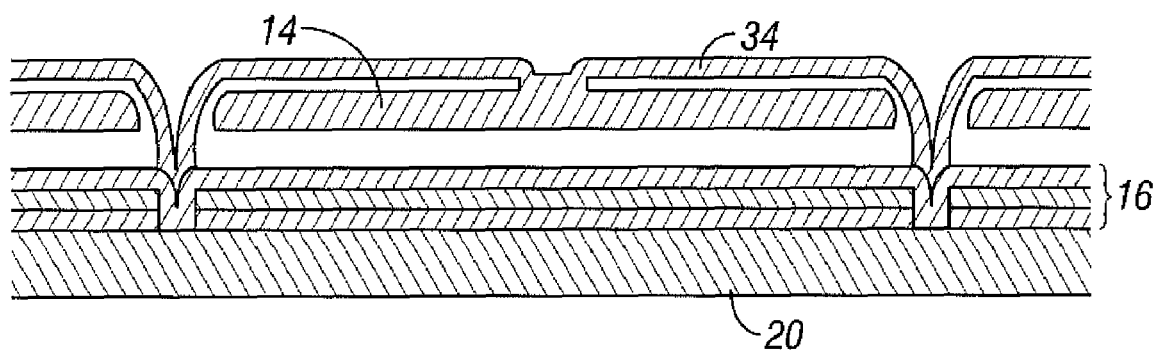
FIG. 7C is a cross section of another alternative embodiment of an interferometric modulator.
Figure 7D:
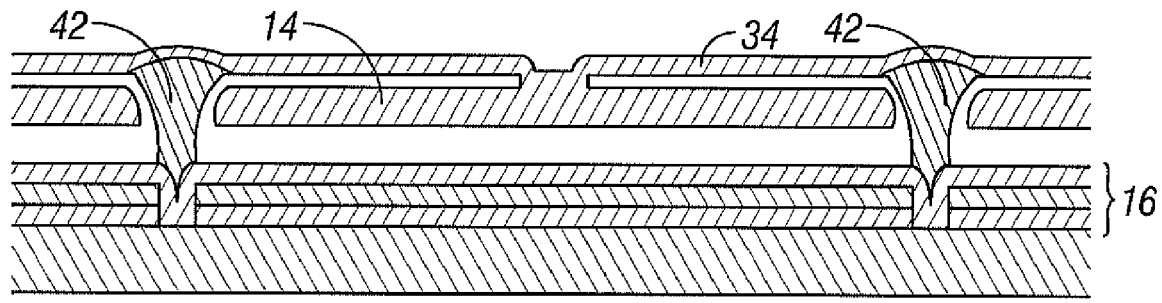
FIG. 7D is a cross section of yet another alternative embodiment of an interferometric modulator.
Figure 7E:
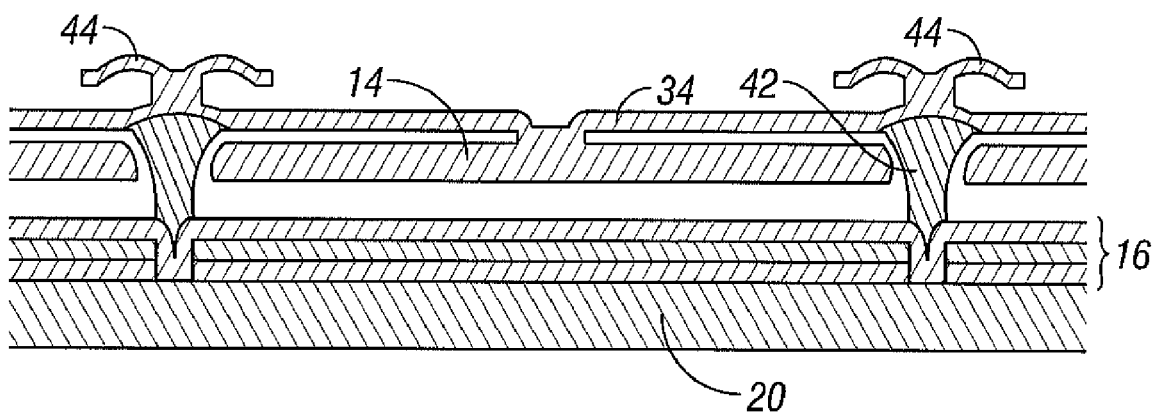
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Active-matrix elements can be used to supply voltages and thereby control the optical state of an interferometric modulator. The active-matrix elements require less power consumption than comparable passive-matrix elements. While an active-matrix element may be positioned adjacent to an interferometric modulator, this would result in a decrease in the pixel aperture ratio and may reduce the brightness or the number of grey levels that can be provided by the device. However, by positioning an active-matrix element behind an interferometric modulator with respect to incident light, the active-matrix element may cause minimal to no decrease in the optical aperture ratio and the device may therefore continue to provide enough brightness or the number of grey levels.

In some embodiments, interferometric modulators and active-matrix elements are formed separately and then appropriately positioned relative to each other. Illustrative methods of separately forming an interferometric modulator and an active-matrix element are described below in FIGS. 8 through 11. FIGS. 12 and 13 describe devices in which active-matrix elements are positioned behind interferometric modulators with respect to incident light, in which both the active-matrix element and the interferometric modulators may be separately formed on two substrates. FIGS. 14 through 20 describe other embodiments in which one or more components of an interferometric modulator and one or more components of an active matrix may be formed on the same substrate.

Formation of an Interferometric Modulator

Figure 8:
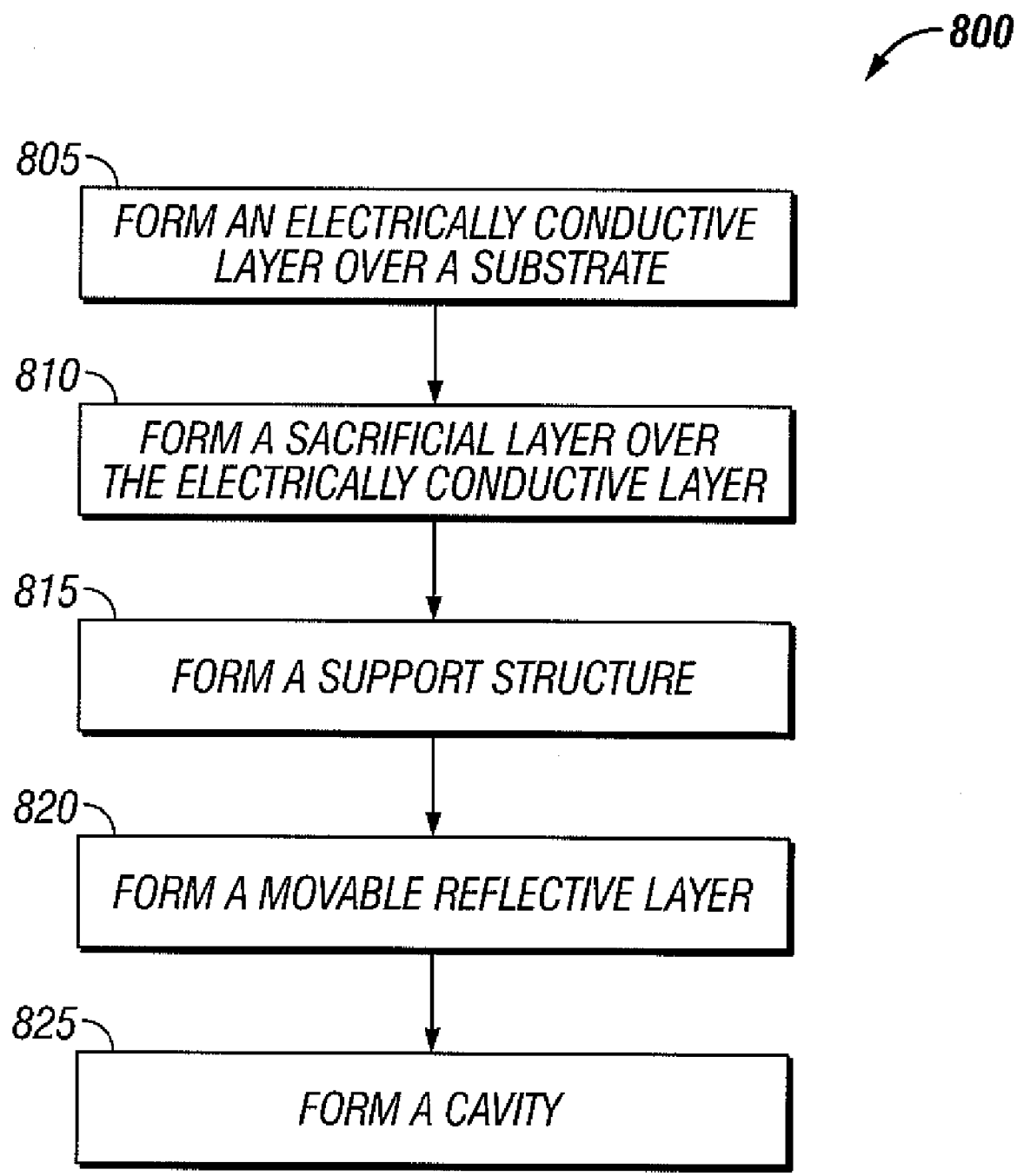
FIG. 8 is a flow diagram illustrating certain steps in an embodiment of a method of making an interferometric modulator.

In overview, FIG. 8 is a flow diagram illustrating certain steps in an embodiment of a method of making a MEMS device. Such steps may be present in a process for manufacturing, e.g., interferometric modulators of the general type illustrated in FIGS. 1 and 7, along with other steps not shown in FIG. 8. FIGS. 9A through 9G schematically illustrate an embodiment of a method for fabricating a MEMS device using conventional semiconductor manufacturing techniques such as photolithography, deposition, masking, etching (e.g., dry methods such as plasma etch and wet methods), etc. Deposition may include "dry" methods such as chemical vapor deposition (CVD, including plasma-enhanced CVD and thermal CVD) and sputter coating, and wet methods such as spin coating. With reference to FIGS. 8 and 9, the process 800 begins at step 805 with the formation of an electrically conductive layer 905 over an interferometric modulator (iMoD) substrate 900. The iMoD substrate 900 may be a transparent substrate such as glass or plastic and may have been subjected to prior preparation step(s), e.g., cleaning, to facilitate efficient formation of the electrically conductive layer 905. The electrically conductive layer 905 can be a single layer structure or a multiple sub-layer structure as described above. In a single layer structure where the layer 905 functions as bottom electrode, the layer 905 is formed by deposition of an electrically conductive material on the iMoD substrate 900. The electrically conductive layer 905 may be formed into electrodes through subsequent patterning and etching not shown in FIG. 8 or 9. The electrically conductive layer 905 may be a metal or a semiconductor (such as silicon) doped to have the desired conductivity. In one embodiment (not shown in FIG. 10), the electrically conductive layer 905 is a multilayer structure comprising a transparent conductor (such as indium tin oxide) or partially reflective layer (such as chromium).

Figure 9A:
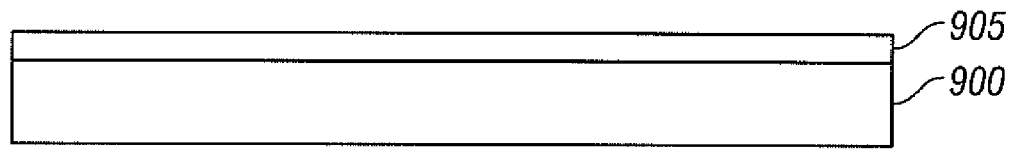
FIGS. 9A through 9G schematically illustrate an embodiment of a method for fabricating an interferometric modulator.
Figure 9B:
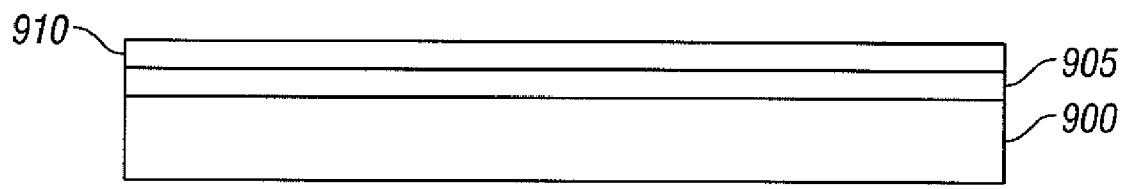

The process 800 continues at step 810 with the formation of a dielectric layer 910 over at least a portion of the electrically conductive layer 905 as shown in FIG. 9B. The dielectric layer 910 may comprise insulating materials such as silicon oxide and/or aluminum oxide. The dielectric layer 910 serves to insulate the first electrically conductive layer 905 from an electrically conductive movable layer (such as movable layer 14 of FIGS. 1 and 7) in an interferometric modulator. The dielectric layer 910 may be formed by known deposition methods, such as CVD. In some embodiments, the optical stack 16 of the resulting device includes both the electrically conductive layer 905 and the dielectric layer 910.

Figure 9C:
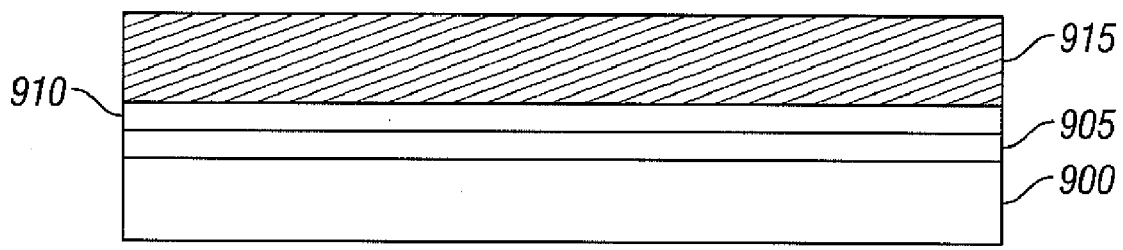
Figure 9D:
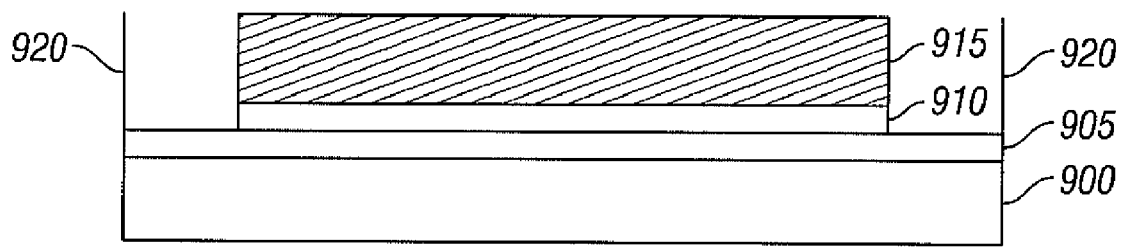
Figure 9E:
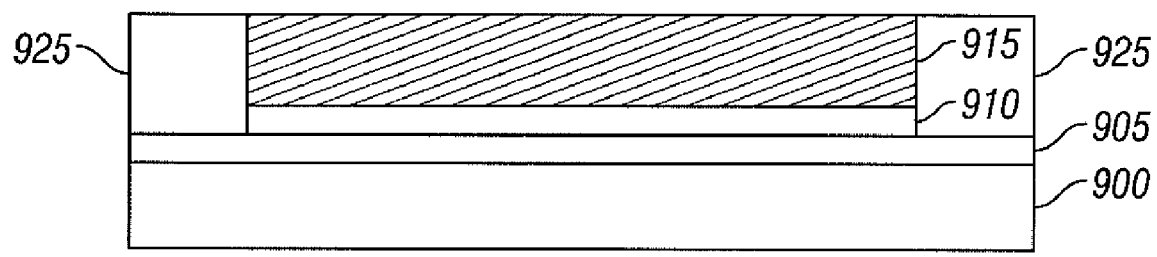

The process 800 continues at step 815 with the formation of a sacrificial layer 915 as shown in FIG. 9C. The sacrificial layer 915 may comprise a material etchable by $XeF_2$, such as molybdenum or amorphous silicon. Deposition methods such as sputtering, evaporation, or CVD (thermal or plasma enhanced) may be used in forming the sacrificial layer 915. The sacrificial layer 915 can be patterned and etched to form one or more support structure apertures 920, as shown in FIG. 9D. In the embodiment shown in FIG. 9D the support structure apertures 920 extend entirely through the first sacrificial layer 915 and the dielectric layer 910 to the first electrically conductive layer 905. As shown in FIG. 9E, at step 820, support structures 925 are formed, which in some embodiments can comprise depositing support material into the apertures 920 from FIG. 9D. The support structures 925 may comprise a non-conductive material.

Figure 9F:
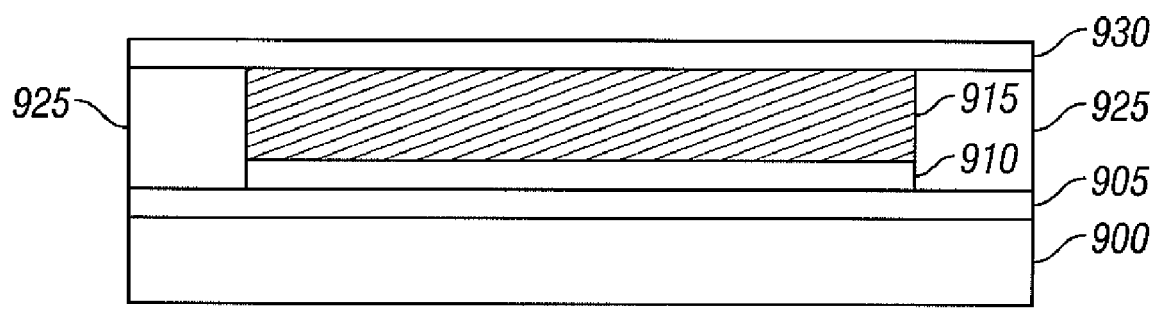

The process 800 continues at step 825 with the formation of a second electrically conductive layer 930 over the sacrificial layer 915 and, in the illustrated embodiment, over the support structures 925, as shown in FIG. 9F. In one embodiment, the second electrically conductive layer will comprise a movable layer such as the movable layer 14 of an interferometric modulator as shown in FIGS. 1 and 7. Since the sacrificial layer 915 is still present at this stage of the process 800, the movable layer is typically not yet movable. A partially fabricated MEMS device, e.g. a partially fabricated interferometric modulator, that contains a sacrificial layer (the layer 915 in this embodiment) may be referred to herein as an "unreleased" MEMS device. The second electrically conductive layer 930 may comprise a metal (e.g. aluminum or aluminum alloy). In some embodiments, the second electrically conductive layer 930 comprises aluminum. Forming the electrically conductive layer 930 in step 850 may include one or more deposition steps as well as one or more patterning or masking steps.

Figure 9G:
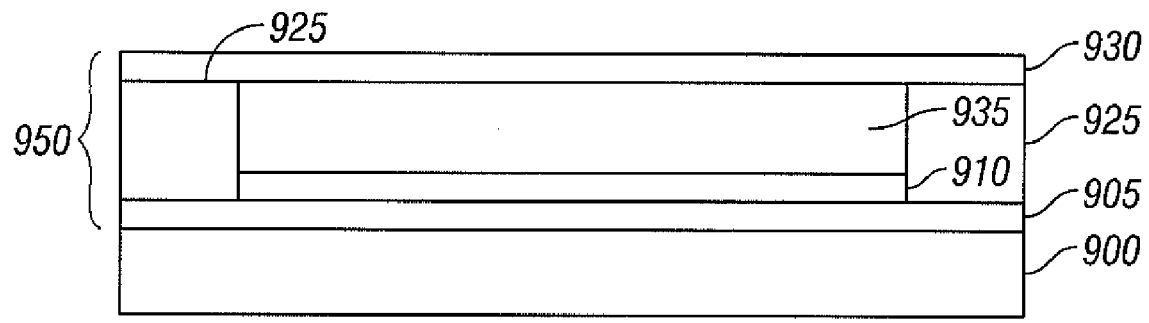

The process 800 continues at step 830 where the sacrificial layer 915 is removed (e.g., by etching) as shown in FIG. 9G. One or more support structures 925 can support the second electrically conductive layer 930, thereby forming a gap or a cavity 935. In some embodiments, the cavity 935 is formed between the dielectric layer 910 and the second electrically conductive layer 930 as illustrated in FIG. 9G. Since the sacrificial layer is removed during step 830 of the process 800, the second electrically conductive layer 930 is typically movable after this stage. After removal of the sacrificial material, the resulting fully or partially fabricated interferometric modulator may be referred to herein as a "released" interferometric modulator.

Formation of a Control Element

In embodiments described further herein, the MEMS device is controlled by a control element. The control element may comprise one or more of an electronic switching element and a transistor. The control element may be an active matrix element, which may comprise one or more of a transistor (e.g., a thin-film transistor), a diode, a MEMS switch, and may further comprise, a semiconductor film comprising one or more of amorphous silicon, polycrystalline silicon, and CdSe. Active matrix elements may be formed by a variety of methods and are not limited to those described herein.

Figure 10:
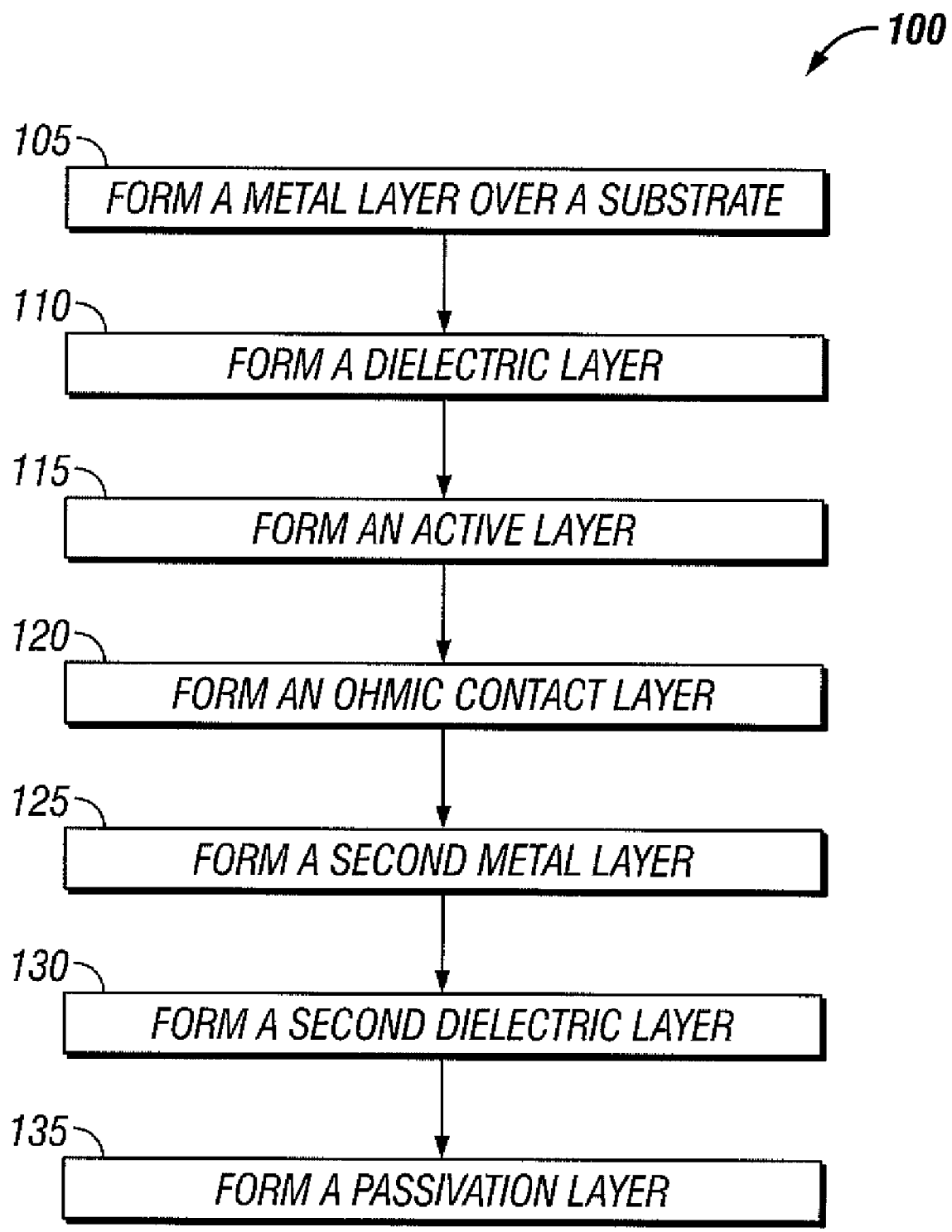
FIG. 10 is a flow diagram illustrating certain steps in an embodiment of a method of making an active matrix element.

FIG. 10 is a flow diagram illustrating certain steps in an embodiment of a method of making an active matrix element. Such steps may be present in a process for manufacturing, along with other steps not shown in FIG. 10. FIGS. 11A through 11J schematically illustrate an embodiment of a method for fabricating an active matrix element using conventional semiconductor manufacturing techniques such as photolithography, deposition, masking, etching (e.g., dry methods such as plasma etch and wet methods), etc. Deposition may include "dry" methods such as chemical vapor deposition (CVD, including plasma-enhanced CVD and thermal CVD) and sputter coating, and wet methods such as spin coating.

With reference to FIGS. 10 and 11, the process 100 begins at step 105 with the formation of a metal layer 205 over an active matrix (AM) substrate 200. The AM substrate 200 may comprise silicon. The metal layer 205 may comprises one or more of chromium, molybdenum, aluminum, and an aluminum alloy. As shown in FIG. 11B, a portion of the metal layer 205 can be removed using, for example, a photolithography technique and an etching technique.

Figure 11A:
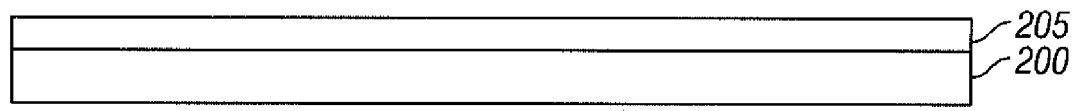
FIGS. 11A through 11J schematically illustrate an embodiment of a method for fabricating an active matrix element.
Figure 11B:
Figure 11C:
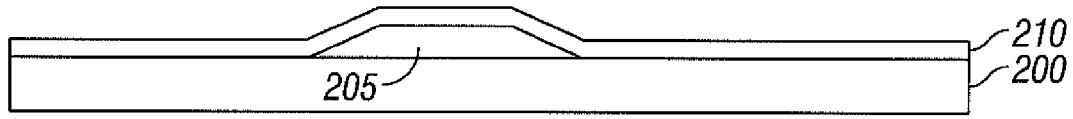
Figure 12:
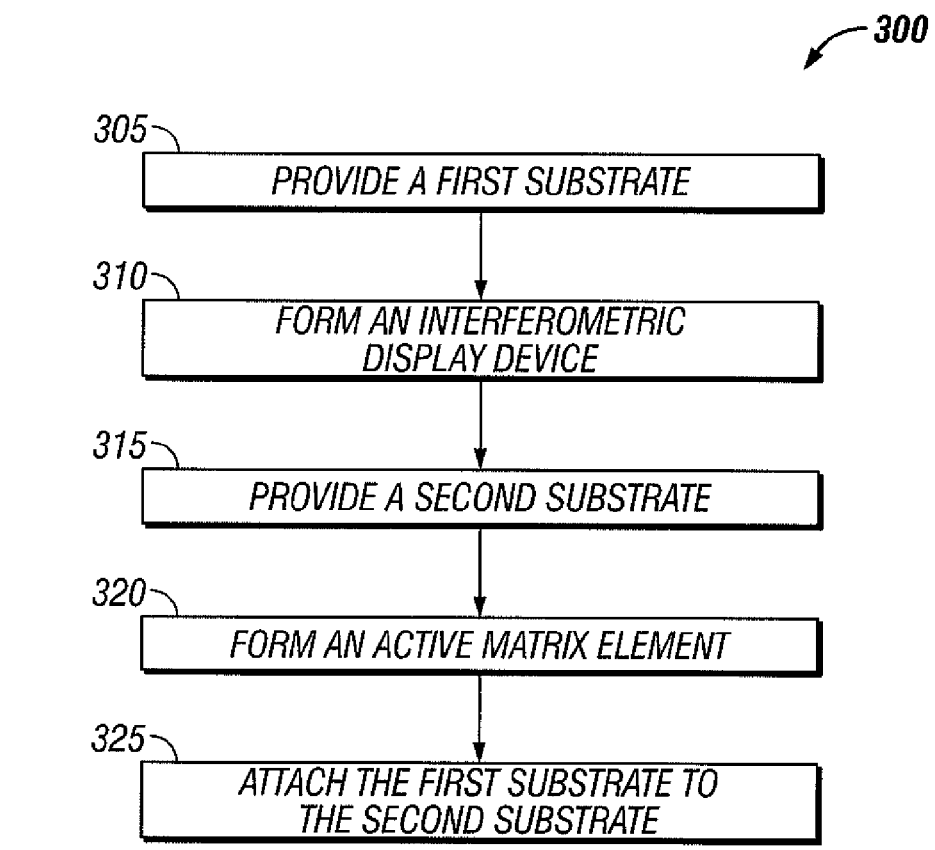
FIG. 12 is a flow diagram illustrating certain steps in an embodiment of a method of making a MEMS device.

The process 100 continues at step 110 with the formation of a dielectric layer 210 over the metal layer 205 as shown in FIG. 11C. The dielectric layer 210 may comprise insulating materials such as amorphous silicon nitride ($SiN_x$), silicon oxynitride, nitrogen doped silicon oxide and/or another dielectric material.

Figure 11D:
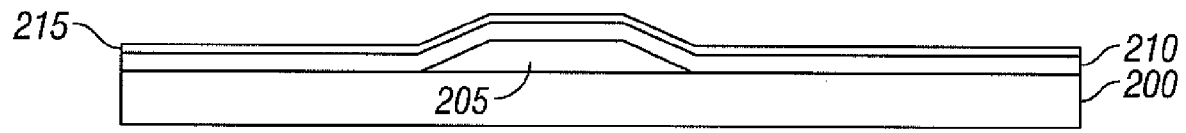

The process 100 continues at step 115 with the formation of an active layer 215 as shown in FIG. 11D. In some embodiments, the active layer 215 comprises amorphous silicon. In some embodiments, the active layer 215 and the dielectric layer 210 are deposited together. One or both of these layers can be deposited by, for example, plasma-enhanced chemical vapor deposition.

Figure 11E:
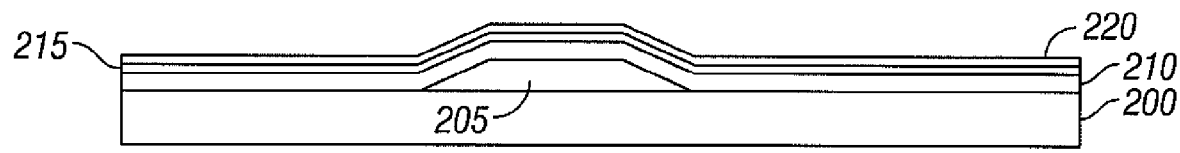

The process 100 continues at step 120 with the formation of an ohmic contact layer 220 as shown in FIG. 11E. In some embodiments, the ohmic contact layer 220 comprises phosphorus-doped (or n+ doped) amorphous silicon. In some embodiments, the ohmic contact layer 220 comprises n+ doped amorphous silicon.

Figure 11F:
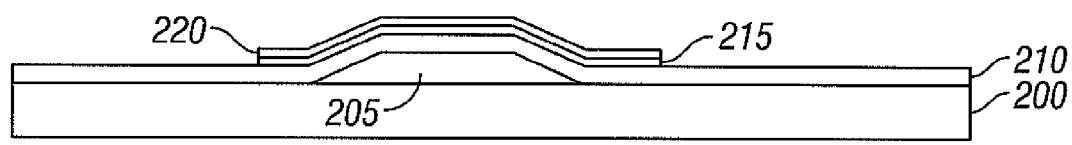

As shown in FIG. 11F, a portion of the active layer 215 and the ohmic contact layer 220 can be removed using, for example, a photolithography technique and an etch technique, thereby forming a thin-film transistor island, comprising metal layer 205, a portion of dielectric layer 210, active layer 215, and ohmic contact layer 220.

Figure 11G:
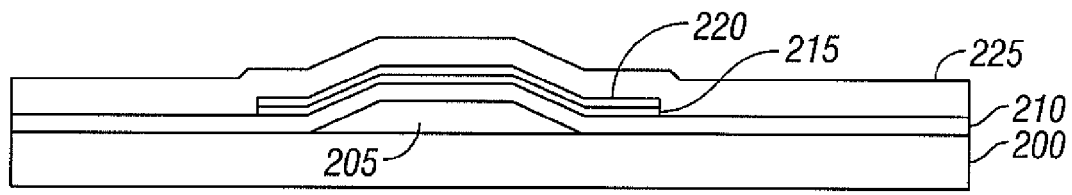

The process 100 continues at step 125 with the formation of a second metal layer 225 as shown in FIG. 11G. The second metal layer 225 may comprise, for example, molybdenum, aluminum, or chromium.

Figure 11H:
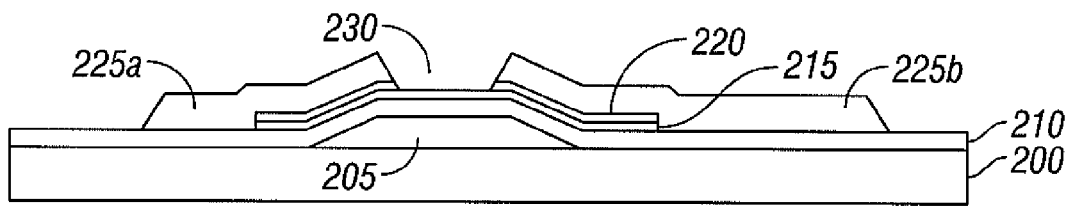

As shown in FIG. 11H, a portion of the second metal layer 225 can be removed using, for example, a photolithography and a dry-etch technique. The photolithography can divide the second metal layer 225 into two portions forming a gap 230 in between and thereby forming a drain electrode 225a and a source electrode 225b.

Figure 11I:
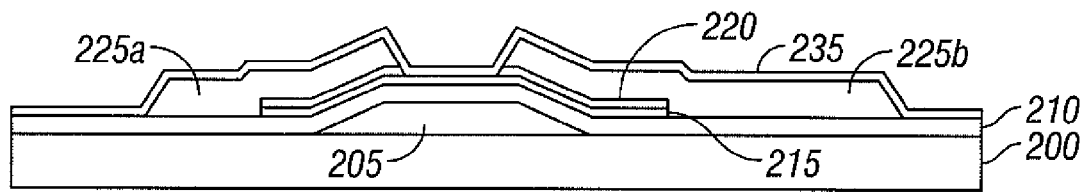

The process 100 continues with optional step 130 with the formation of a second dielectric layer 235 as shown in FIG. 11I. The second dielectric layer 235 may comprise amorphous silicon nitride or amorphous silicon oxide.

Figure 11J:
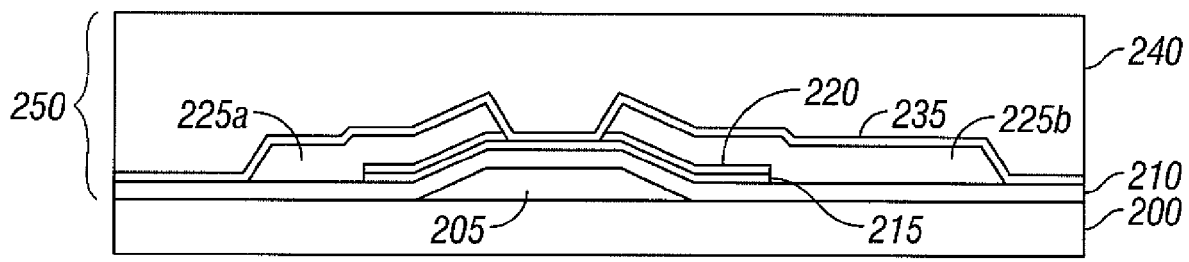

The process 100 continues at step 135 with the formation of a passivation layer 240 as shown in FIG. 11J. The passivation layer 240 may comprise passivation and/or planarization materials such as polyimide, polyamide, acrylic, or BCB (benzocyclobutane).

The resulting structure comprising the metal layer 205, dielectric layer 210, active layer 215, ohmic contact layer 220, drain electrode 225a, source electrode 225b, second dielectric layer 235 and passivation layer 240 is one example of what will be referred to herein as an active matrix element 250.

Devices Comprising a Control and an iMoD

In embodiments described herein, an interferometric device comprises an interferometric modulator (iMoD) and at least one control element coupled to the iMoD, the at least one control element located behind the at least one iMoD with respect to incident light. FIG. 12 presents an overview of one method for forming such a device. The relative positioning of the components of the device may maximize the optical aperture of the iMoD. For example, by constructing the AM element behind the iMoD with respect to the viewer of the iMoD, no or minimal aperture is lost from the iMoD because of the AM element. This is contrary to some possible implementations where the AM element is formed on the same plane as the iMoD and thus takes up some of the available iMoD aperture that could be used for display applications, for example.

FIG. 12 is a flow diagram illustrating certain steps in an embodiment of a method of making a MEMS device including an iMoD and a control element coupled to the iMoD. Such steps may be present in a process for manufacturing, along with other steps not shown in FIG. 12. In overview, FIG. 12 presents an embodiment in which iMoD devices are formed on a first substrate, AM elements are formed on a second substrate, and the first substrate is attached mechanically and electrically to the second substrate so as to form the final device.

The process 300 begins at step 305 with the providing of a first substrate. The first substrate may be a transparent substrate such as glass or plastic and may have been subjected to prior preparation step(s), e.g., cleaning.

The process 300 continues at step 310 with the forming of an interferometric display device. In some embodiments, the forming of an interferometric display device can comprise the process illustrated in FIG. 9. Alternatively, the forming of an interferometric display device can comprise only some of the steps of process illustrated in FIG. 9. The forming of an interferometric display device may comprise forming all components of the interferometric display device over the first substrate, or alternatively may comprise forming only some of the components of the interferometric display device over the first substrate.

The process 300 continues at step 315 with the providing of a second substrate. The second substrate may comprise silicon.

The process 300 continues at step 320 with the forming of an active matrix element. In some embodiments, the forming of an active matrix element can comprise process 100. In other embodiments, the forming of an active matrix element can comprise only some of the steps of process 100. The forming of an active matrix element may comprise forming all components of the active matrix element over the second substrate, or alternatively may comprise forming only some of the components of the active matrix element over the second substrate.

The process 300 continues at step 325 with the attaching the first substrate to the second substrate. The substrates may be attached using one or more of supports, spring-loaded electrodes, conductive epoxy glue, and supports comprising flexible components. Supports comprising flexible components may include a tension member to ensure solid contact between layers separated by the support. The substrates may be attached such that the active matrix element is positioned behind the interferometric display device with respect to incident light.

In various embodiments, some of the components of the active matrix element may be formed over the first substrate and other active matrix element components over the second substrate. Alternatively in other embodiments, some of the components of the interferometric display device may be formed over the first substrate and other interferometric display device components may be formed over the second substrate.

Devices Enabling Separate Formation of a Control Element and an iMoD

FIG. 13 illustrates various configurations for iMoDs coupled to control elements, allowing for separate formation of the iMoDs and the control elements. The iMoDs and control elements may be directly or indirectly connected by supports. All configurations include an active matrix element behind an interferometric modulator with respect to incident light. It will be understood that the devices shown in FIG. 13 may be formed by other methods in which the control element and the iMoD are not separately formed.

Figure 13A:
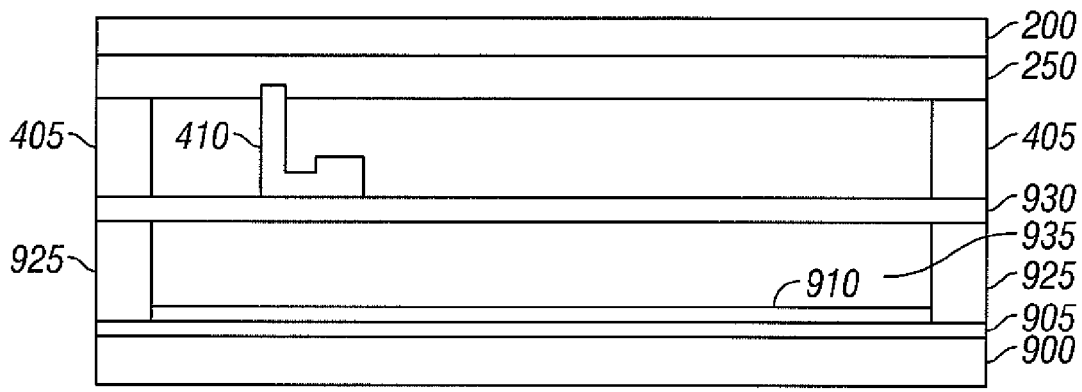
FIGS. 13A through 13C illustrate MEMS devices comprising an active matrix element and an interferometric modulator.
Figure 13B:
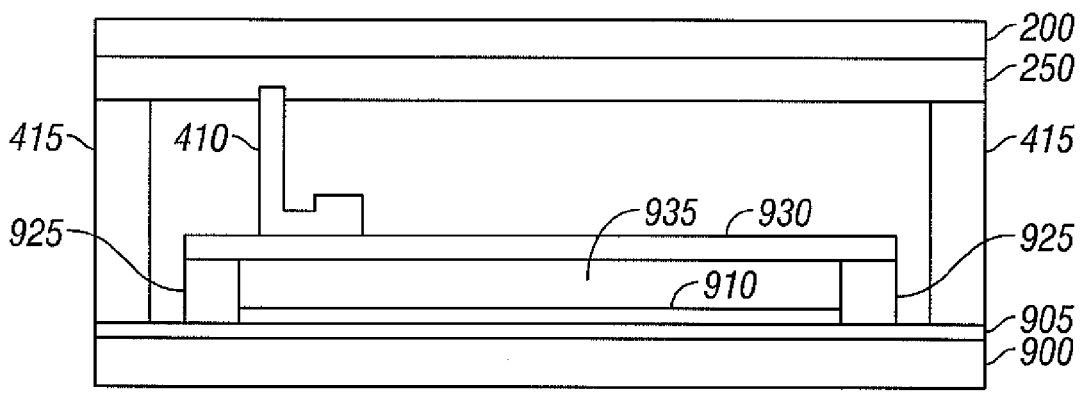
Figure 13C:
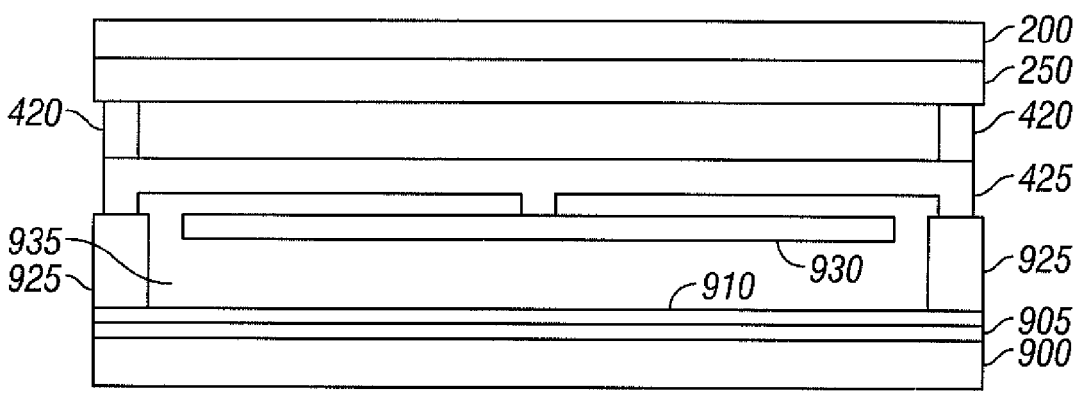

As shown in FIGS. 13A and 13B, in some embodiments, an iMoD is formed over an iMoD substrate 900. The iMoD may comprise an electrically conductive layer 905 and a second electrically conductive layer 930, which may be a movable electrode. The iMoD may further include a dielectric layer 910, one or more support structures 925, and/or a cavity 935. In some embodiments, the iMoD is formed on the iMoD substrate 900 by the process illustrated in FIG. 9. An active matrix element 250 may be formed on an AM substrate 200. While the active matrix element 250 may be the same as that indicated in FIG. 11 and may be formed by process 100, it will be understood that the active matrix element 250 need not be formed by process 100 and need not be the active matrix element illustrated in FIG. 11. An electrical connection 410 may connect the active matrix element 250 to the second electrically conductive layer 930 of the iMoD. The electrical connection 410 may, for example, connect a source electrode 225b (not shown in FIG. 13 for the sake of clarity) of the active matrix element 250 to the second electrically conductive layer 930. The electrical connection 410 may comprise a metal, which may be nickel. The device may further comprise one or more second supports, which may comprise flexible components. The one or more second supports may include one or more short supports 405 that are positioned between the second electrically conductive layer 930 and the AM substrate 200, as, for example, illustrated in FIG. 13A. The one or more second supports may include one or more long supports 415 that are positioned between the AM substrate 200 and the iMoD substrate 900, as, for example, illustrated in FIG. 13B.

In some embodiments, the second electrically conductive layer 930 of the iMoD is not supported by the one or more support structures 925. Instead, the second electrically conductive layer 930 may be connected to a spring hanger 425. The spring hanger 425 may also comprise an electrically conductive material. The spring hanger 425 may be connected to the active matrix element 250 by one or more electrically-conductive supports 420.

In some embodiments, the iMoD may be connected to the active matrix element by a support with a flexible component formed either over the iMoD substrate 900 or over the AM substrate 200. Spring-loaded electrodes may provide strong electrical connections Forming Components of an iMoD and of a Control Element on the Same Substrate In embodiments described with respect to FIGS. 14 through 16, components of an interferometric modulator are formed on one substrate, and components of an active matrix element are formed on another substrate. In such instances, an interferometric modulator and/or an active matrix element may not be fully formed on either substrate, but when the two substrates are directly or indirectly attached mechanically and electrically to each other, the device comprises both a fully-formed interferometric modulator and an active matrix element. A potential advantage of such arrangement is a reduction in processing steps needed to fabricate the final interferometric modulator device and controlling AM element.

Figure 14:
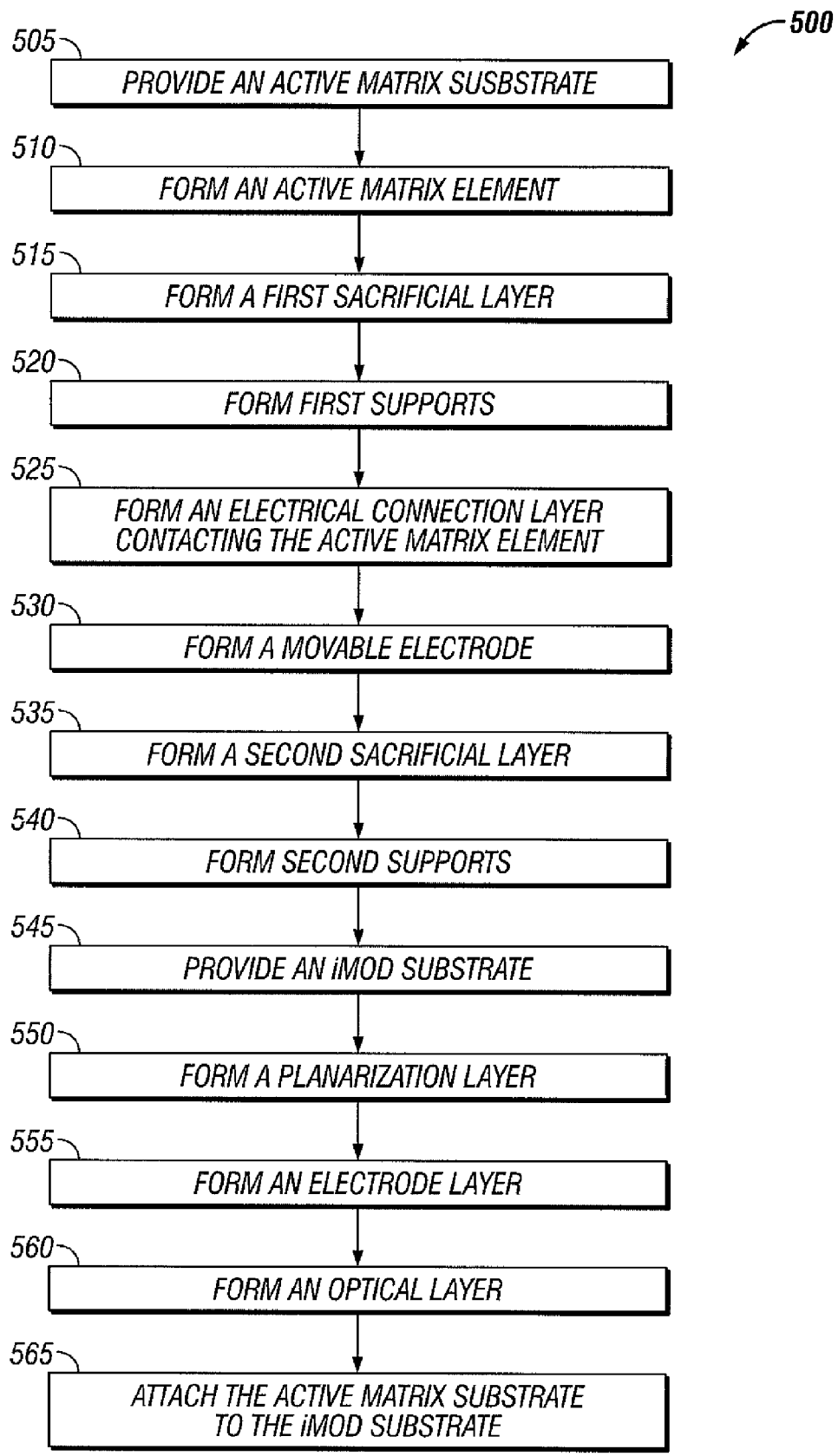
FIG. 14 is a flow diagram illustrating certain steps in an embodiment of a method of making a MEMS device comprising an active matrix element and an interferometric modulator.
Figure 15A:
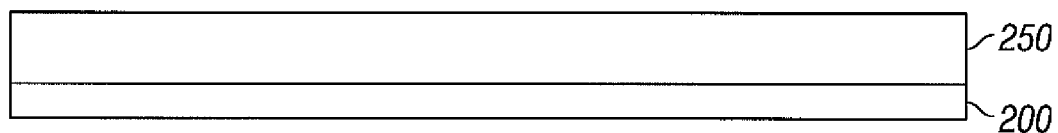
FIGS. 15A through 15Q schematically illustrate an embodiment of a method for fabricating a MEMS device comprising an active matrix element and an interferometric modulator.

FIG. 14 is a flow diagram illustrating certain steps in an embodiment of a method of making a MEMS device. Such steps may be present in a process for manufacturing, along with other steps not shown in FIG. 14. FIGS. 15A through 15Q schematically illustrate an embodiment of a method for fabricating a MEMS device using conventional semiconductor manufacturing techniques such as photolithography, deposition, masking, etching (e.g., dry methods such as plasma etch and wet methods), etc. Deposition may include "dry" methods such as chemical vapor deposition (CVD, including plasma-enhanced CVD and thermal CVD) and sputter coating, and wet methods such as spin coating.

With reference to FIGS. 14 and 15, the process 500 begins at step 505 with the providing of an active matrix (AM) substrate 200. The AM substrate 200 may comprise one or more of a glass substrate, a flexible/plastic substrate, and a silicon substrate with a coated insulator such as silicon oxide or silicon nitride.

The process 500 continues at step 510 with the formation of an active matrix element 250 on the AM substrate 200, as shown in FIG. 15A. While the active matrix element 250 may be the same as that indicated in FIG. 11 and may be formed by process 100, because there are several methods and structures may be used, active matrix element 250 need not be formed by process 100 and need not be the active matrix element illustrated in FIG. 11.

Figure 15B:
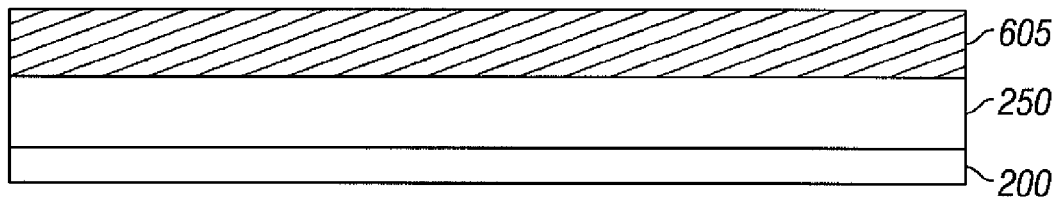
Figure 15C:
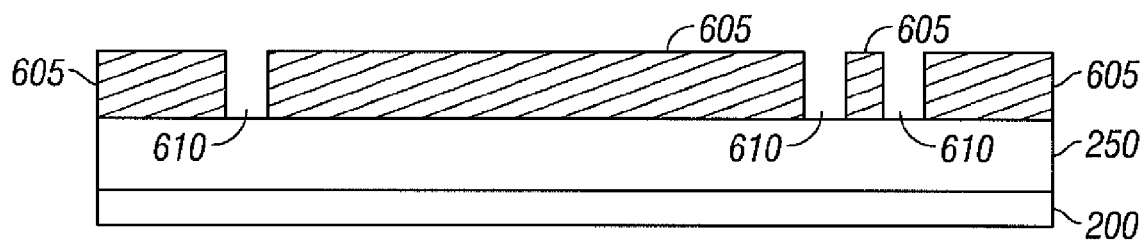

The process 500 continues at step 515 with the formation of a first sacrificial layer 605, which may be formed over the active matrix element 250, as shown in FIG. 15B. The first sacrificial layer 605 may comprise a material etchable by XeF$_2$, such as molybdenum or amorphous silicon. Deposition methods such as CVD, sputtering or spin coating may be used in forming the first sacrificial layer 605. The first sacrificial layer 605 can be patterned and etched to form one or more first support structure apertures 610, as shown in FIG. 15C.

Figure 15D:
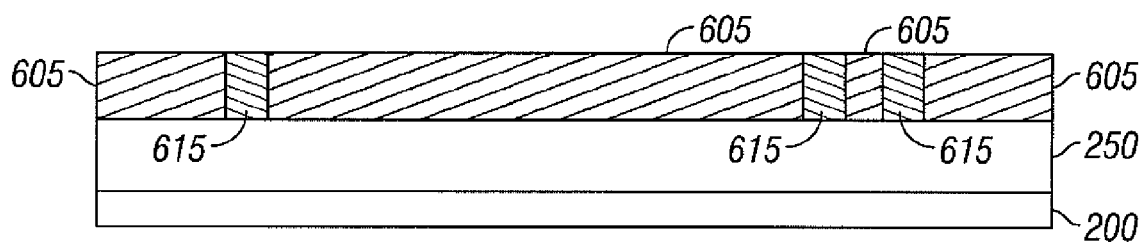
Figure 15E:
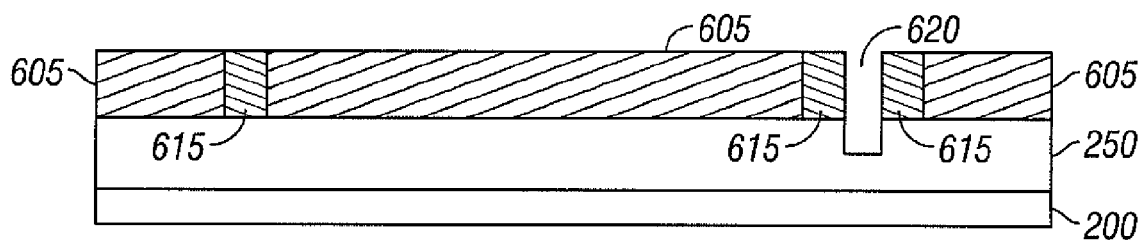

The process 500 continues at step 520 with the formation of one or more first support structures 615, which, in some embodiments, can comprise depositing support material into the first apertures 610 shown in FIG. 15D. The one or more first support structures 615 may comprise a non-conductive material. The first sacrificial layer 605 can again be patterned and etched to form an electrical connection aperture 620, as shown in FIG. 15E.

Figure 15F:
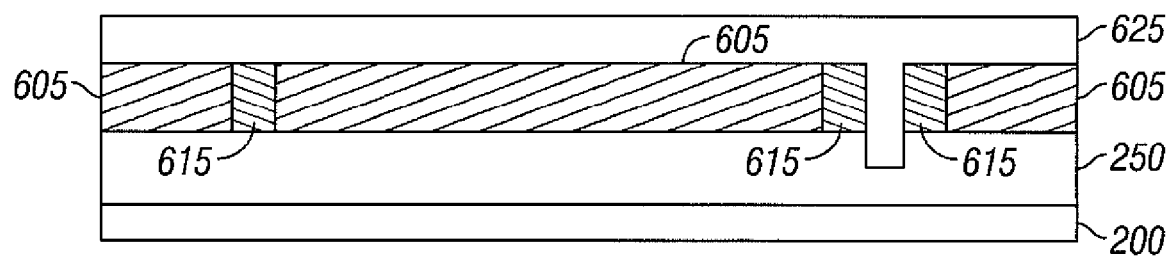
Figure 15G:
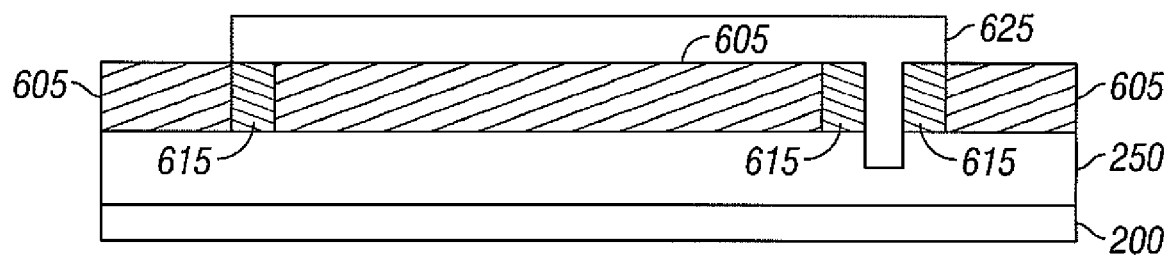

The process 500 continues at step 525 with the formation of an electrical connection layer 625, as shown in FIG. 15F. The electrical connection layer 625 may be formed above the one or more first support structures 615 and/or above the first sacrificial layer 605. The electrical connection layer may comprise a metal, which may be, for example, nickel. The electrical connection layer 625 can be patterned and etched, such that, for example, the electrical connection layer does not extend past the support structures 615, as shown in FIG. 15G.

Figure 15H:
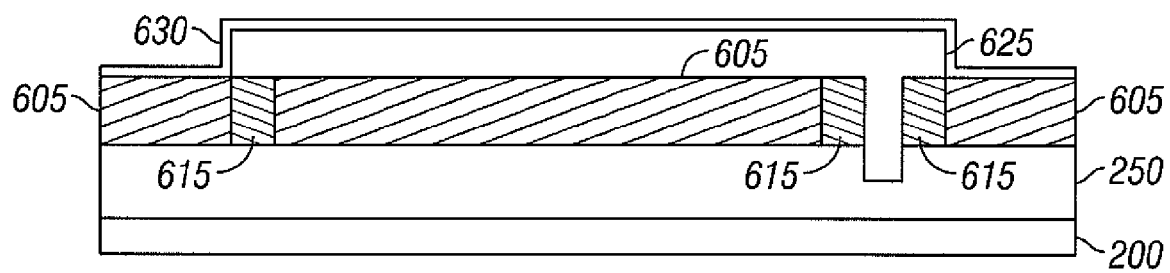
Figure 15I:
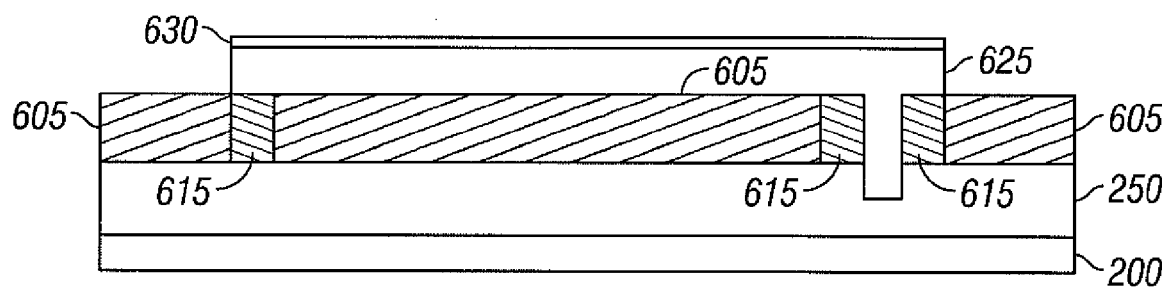

The process 500 continues at step 530 with the formation of a movable electrode 630, as shown in FIG. 15H. The movable electrode 630 may comprise an electrically conductive material. The moveable electrode 630 may be formed on the electrical connection layer 625. The movable electrode 630 can be patterned and etched, such that, for example, the electrical connection layer does not extend past the support structures 615, as shown in FIG. 15I.

Figure 15J:
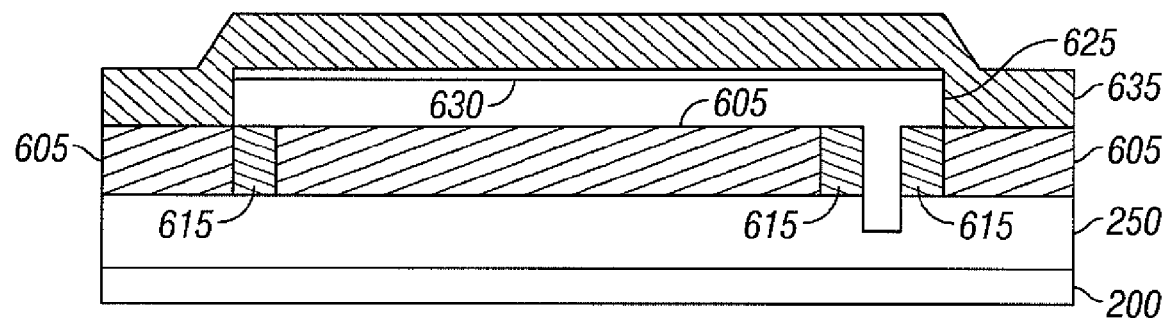

The process 535 continues at step 530 with the formation of a second sacrificial layer 635, which may be formed over the movable electrode 630, as shown in FIG. 15J. The second sacrificial layer 635 may comprise a material etchable by XeF$_2$, such as molybdenum or amorphous silicon. The second sacrificial layer 635 can be patterned and etched to form one or more second support structure apertures 640, as shown in FIG. 15K.

Figure 15K:
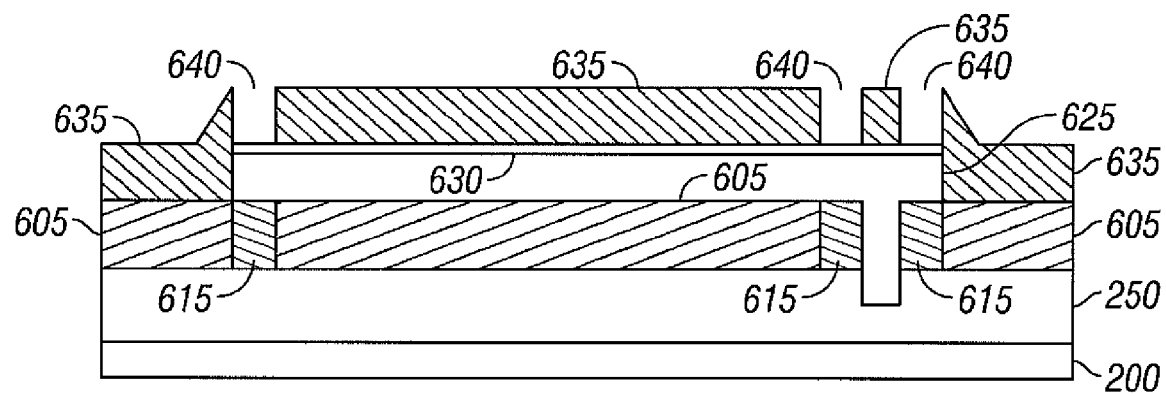
Figure 15L:
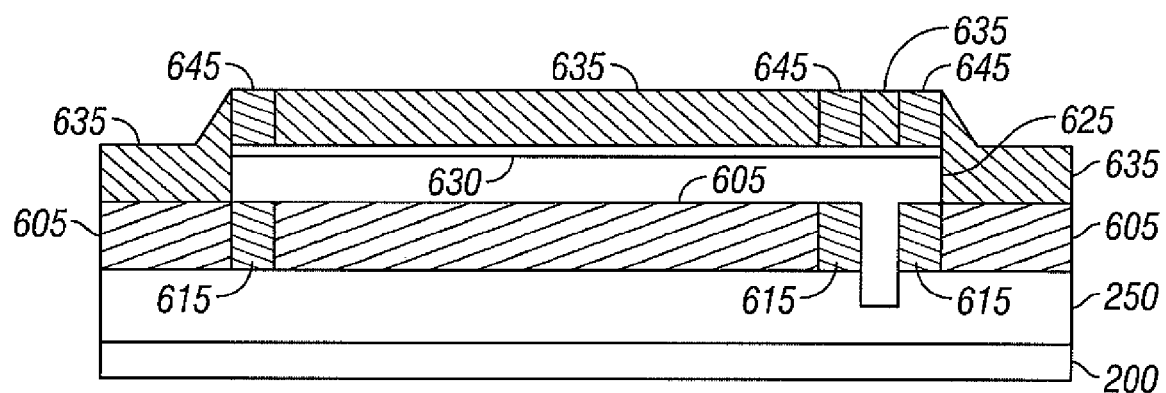
Figure 15M:
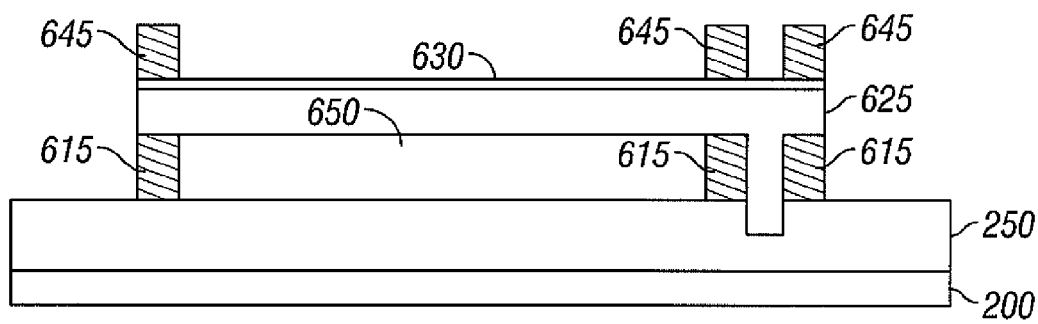

The process 500 continues at step 540 with the formation of one or more second support structures 645, which, in some embodiments, can comprise depositing support material into the apertures 640 shown in FIG. 15K. The one or more second support structures 645 may comprise a non-conductive material. The first sacrificial layer 605 and/or the second sacrificial layer 635 may be removed (e.g., by etching) as shown in FIG. 15M. Both sacrificial layers 605 and 635 may be removed simultaneously. The first support structures 615 can support the second electrically conductive layer 930, thereby forming a first cavity 650. In some embodiments, the cavity 650 is formed between the active matrix element 250 and the electrical connection layer 625. In some embodiments, the cavity 650 is formed between the active matrix element 250 and the movable electrode 630. At this point in process 500, an active matrix element has been formed (e.g. on a non-transparent silicon substrate) and an iMoD has been partially formed atop the AM element.

Figure 15N:
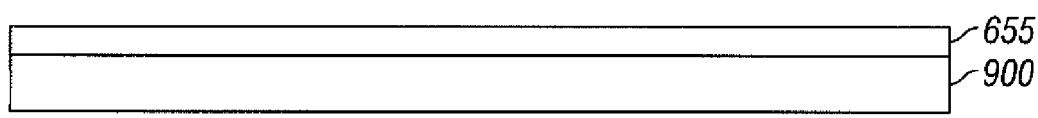

The process 500 continues at step 545 with the providing of an iMoD substrate 900. The iMoD substrate 900 may be a transparent substrate such as glass or plastic and may have been subjected to prior preparation step(s), e.g., cleaning. At step 550 and as shown in FIG. 15N, a planarization layer 655 is formed on the iMoD substrate 900. The planarization layer 655 may comprise one or more color filters to modify a color of light reflected from the iMoD and/or black masks.

Figure 15O:

The process 500 continues at step 555 with the formation of an electrode layer 905, as shown in FIG. 15O. The electrode layer 905 may comprise a transparent conductive material, such as, for example, indium tin oxide (ITO). The electrode layer 905 may be formed on the planarization layer 655.

Figure 15P:
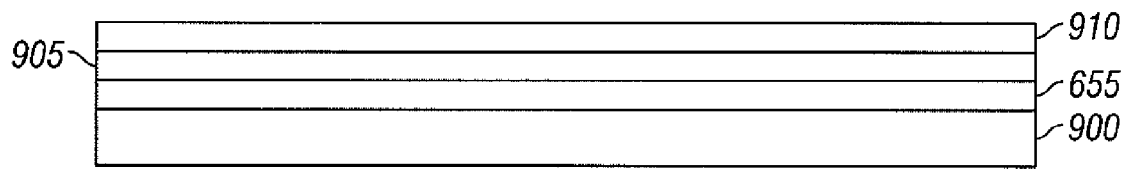
Figure 15Q:
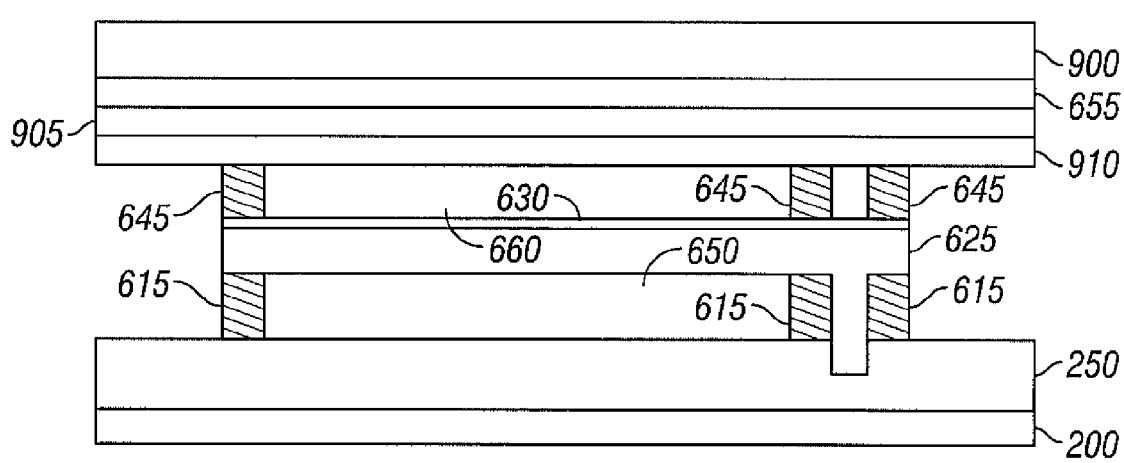

The process 500 continues at step 560 with the formation of an optical layer 910, as shown in FIG. 15P. The optical layer 910 may be a dielectric layer such as an oxide, formed on or over the electrode layer 905.

The process 500 continues at step 555 with mechanical and electrical attachment of the AM substrate 200 to the iMoD substrate 900, as shown in FIG. 15Q. The attachment can be an indirect attachment. For example, the second support structures attached to the AM substrate 200 may be attached to the optical layer 910 attached to the iMoD substrate 900. Any suitable means may be used to attach the substrates. In some embodiments, components are attached using, for example, epoxy glue which may be electrically conductive.

FIG. 16 illustrates an alternative process for manufacturing a MEMS device comprising an interferometric modulator and an active matrix element. Initially, the device may be formed as illustrated in FIG. 15A-15I. The first sacrificial layer 605 may then be removed (e.g., by etching) as shown in FIG. 16A. A third sacrificial layer 705 may be formed over the movable electrode 630, as shown in FIG. 16B.

Figure 16A:
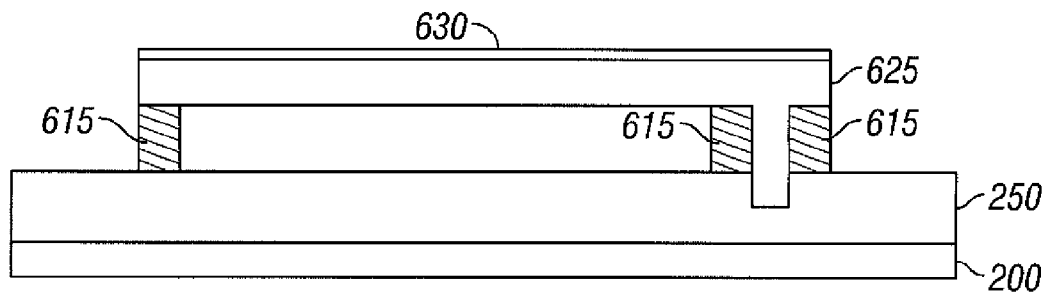
FIGS. 16A through 16F schematically illustrate an embodiment of a method for fabricating a MEMS device comprising an active matrix element and an interferometric modulator.
Figure 16B:
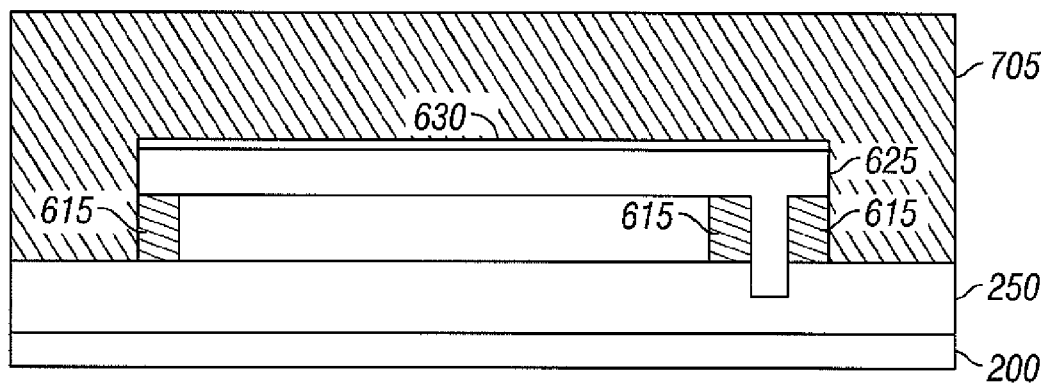
Figure 16C:
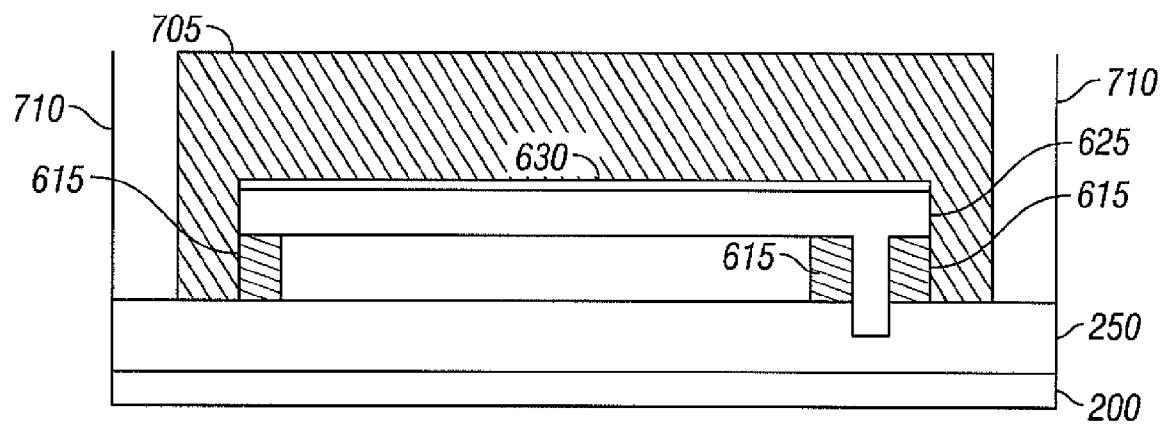
Figure 16D:
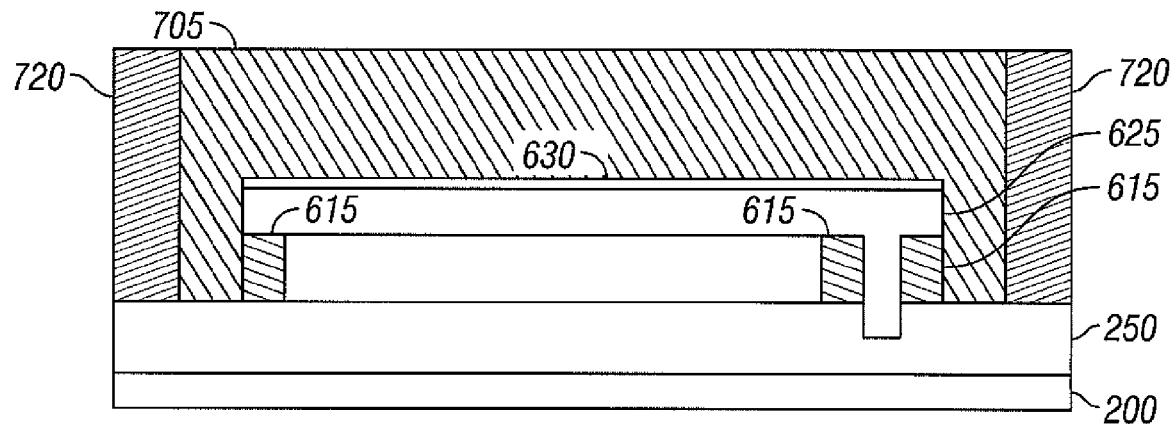
Figure 16E:
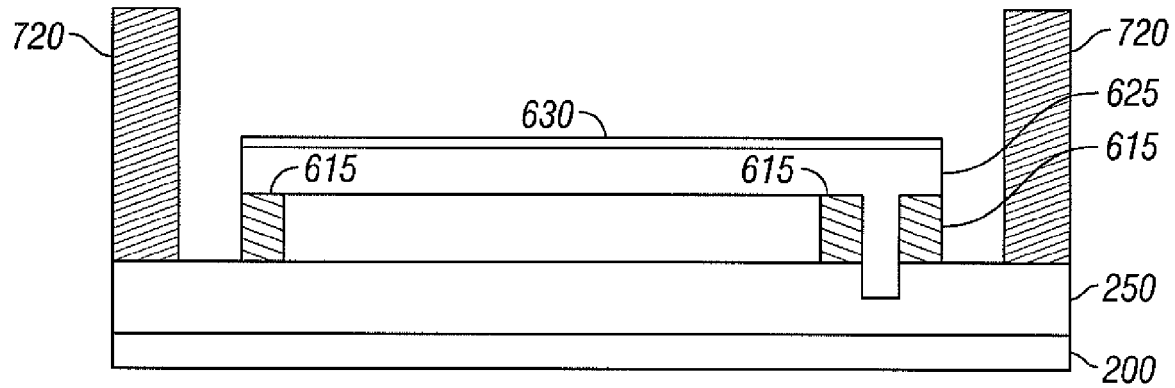
Figure 16F:
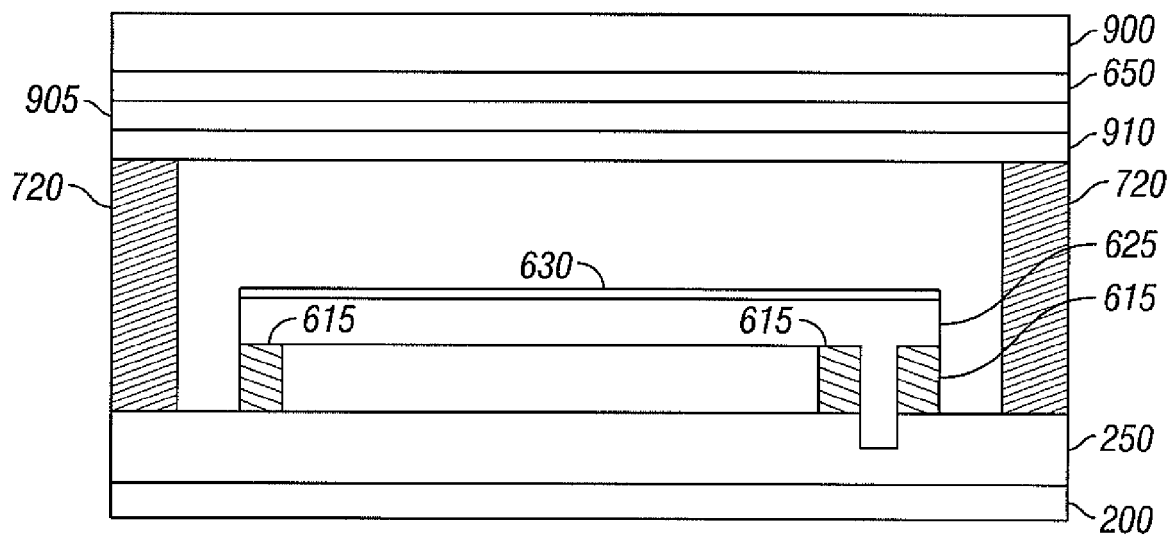

The third sacrificial layer 705 can be patterned and etched to form one or more third support structure apertures 710, as shown in FIG. 16C. One or more third support structures 720 are formed, which, in some embodiments, can comprise depositing support material into the apertures 710 shown in FIG. 16D. The one or more third structures 720 may comprise a non-conductive material. The third sacrificial layer 705 may be removed (e.g., by etching) as shown in FIG. 16E. The resulting component may then be attached to the iMoD device component of FIG. 15P, as shown in FIG. 16F. Any suitable means may be used to attach the substrates. In some embodiments, components are attached using, for example, epoxy glue.

Devices in which Active Matrix Elements are Connected to Non-Movable Electrodes

Embodiments shown in FIGS. 13, 15 and 16 include devices in which the active matrix elements are connected to the movable electrode of the iMoD and in which the active matrix elements and the non-movable electrodes of the iMoDs are on opposite sides of the movable electrodes of the iMoDs. However, other embodiments include devices in which the active matrix element is connected to the non-movable electrode of the iMoD. The active matrix elements and the interferometric modulators of these devices may be formed over the same substrate, which may reduce manufacturing steps.

Figure 17:
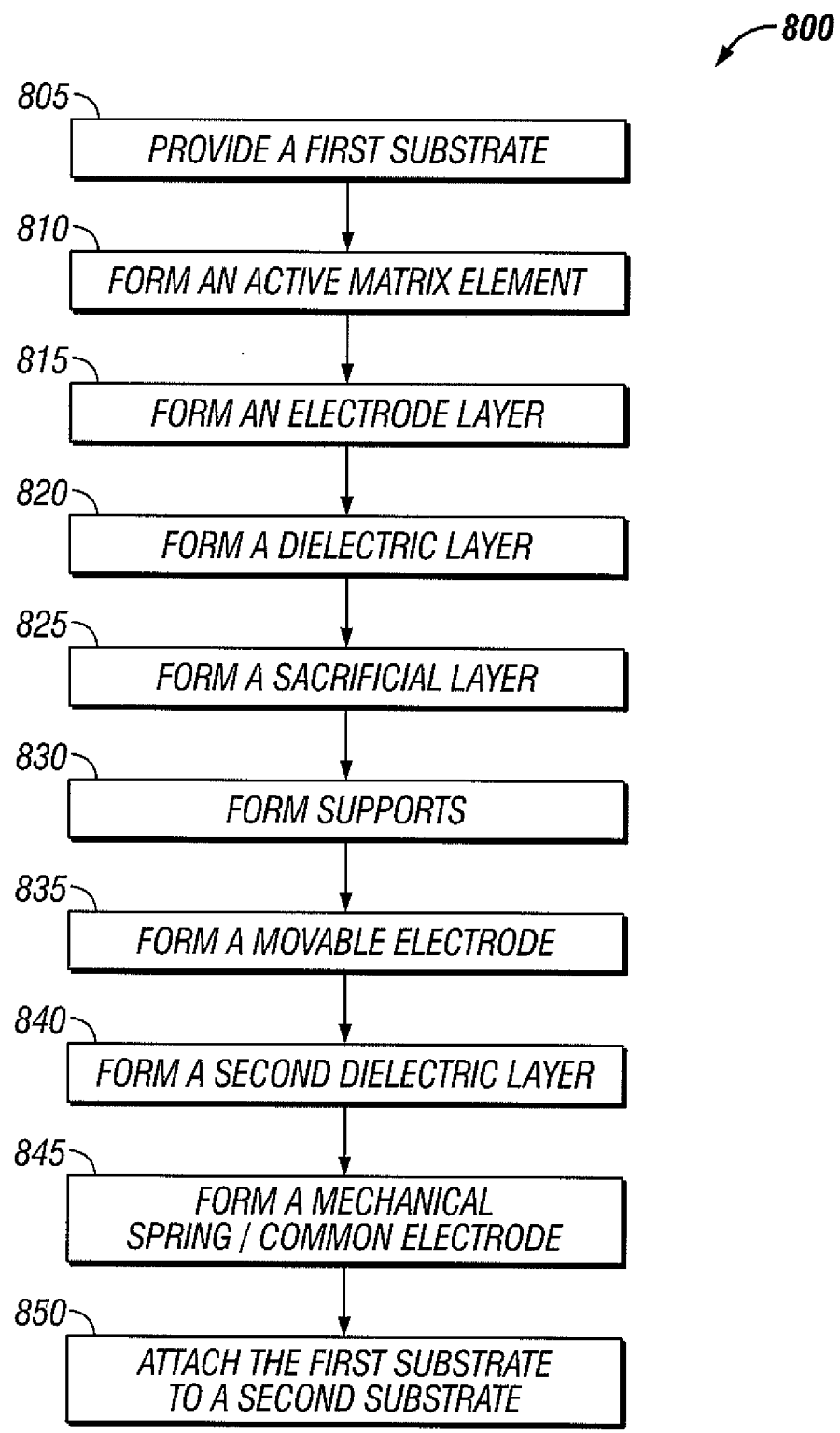
FIG. 17 is a flow diagram illustrating certain steps in an embodiment of a method of making a MEMS device comprising an active matrix element and an interferometric modulator.

FIG. 17 refers to an embodiment in which active matrix elements and non-movable electrodes are positioned on the same side of the movable electrodes. With reference to FIGS. 17 and 18, the process 800 begins at step 805 with the providing of a first substrate. The first substrate is an AM substrate 200. At step 810, an active matrix element 250 is formed over the AM substrate 200. At step 815, an electrode layer 910 is formed over the active matrix element 250. In some embodiments, the electrode layer 910 is not a common electrode to multiple iMoD pixels. At step 820, a dielectric layer 910 is formed on the electrode layer 910.

At step 825, a sacrificial layer 935 is formed over the dielectric layer 910. The sacrificial layer 935 can be patterned and etched to form one or more support structure apertures and possibly an indentation for the formation of a movable electrode 930. At step 830, supports are formed in the one or more support structure apertures. At step 835, the movable electrode 930 is formed over the sacrificial layer 935. At step 840, a second dielectric layer 1000 is formed over the movable electrode 930. The dielectric layer 1000 may be transparent. In some embodiments, an additional sacrificial layer is formed over the dielectric layer. The sacrificial layer can be patterned and etch to form a spring aperture. The second dielectric layer 1000 may also be etched to form a spring aperture. At step 845, a mechanical spring/common electrode 1100 is formed, which may provide a voltage to the movable electrode 930. The mechanical spring/common electrode 1100 may comprise nickel and/or aluminum. The mechanical spring/common electrode 1100 may extend across multiple pixels. At step 850, the AM substrate 200 is attached to a second substrate 1050. Additional supports may be formed between the AM substrate 200 and the second substrate 1050 in order to attach the substrates.

Figure 18A:
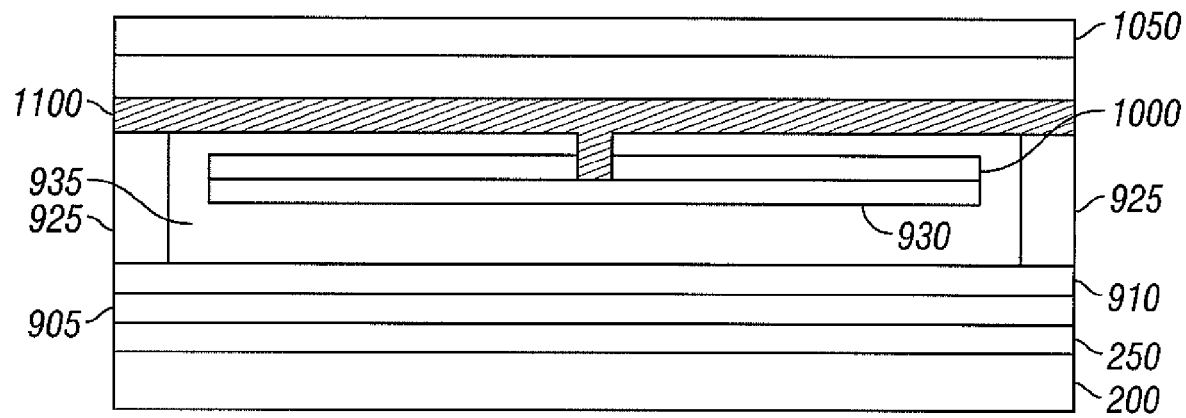
FIGS. 18A through 18B illustrate MEMS devices comprising an active matrix element and an interferometric modulator.
Figure 18B:
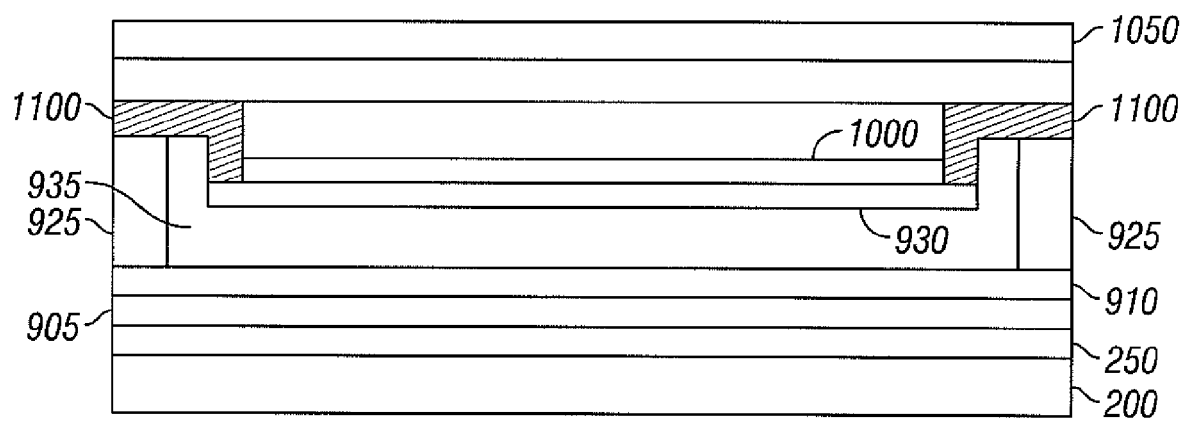

FIGS. 18A and 18B show two MEMS devices in which both the active matrix element 250 and the electrode layer 910 are positioned on the same side of the movable electrode 930. The devices may be made by process 800. In an embodiment, the bottom electrically conductive layer 905 is not shared across pixels, whereas the mechanical spring/common electrode 1100 does extend across pixels. In both embodiments, incident light may enter the device through the second substrate 1050.

In the embodiment illustrated in FIG. 18A, the mechanical spring/common electrode 1100 is a single layer connected to the movable electrode 930. In the embodiment illustrated in FIG. 18B, the mechanical spring/common electrode 1100 is discontinuous, contacting the movable electrode 930 on each side of the movable electrode 930. When the mechanical spring/common electrode 1100 comprises an at least partially opaque material, the device of FIG. 18B may provide the advantage of allowing for more light reflection than the device of FIG. 18A.

In some embodiments, the iMoDs are built in reverse order to that described in FIGS. 8 and 9. An active matrix element may be built over an iMoD, or an iMoD may be built over an active matrix element. Regardless of order, a second encapsulation substrate 1050 may be positioned over the iMoD formed over the AM substrate 200. Incident light may enter through the second substrate 1050, such that the iMoD and active matrix element are behind the second substrate 1050 with respect to incident light.

Devices in which Active Matrix Elements are Formed Over iMoDs

Figure 19:
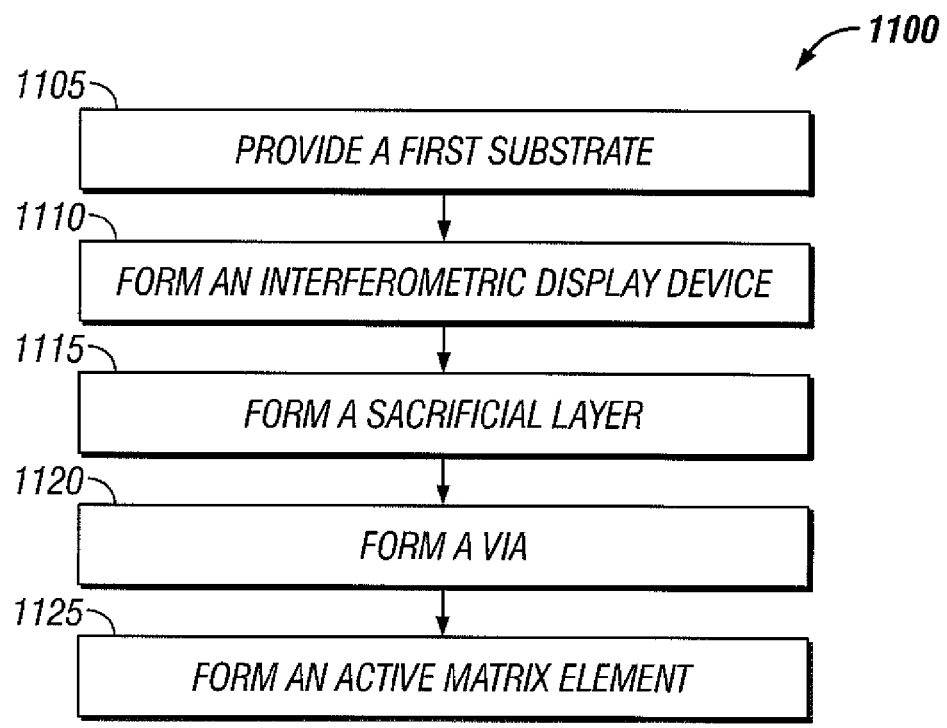
FIG. 19 is a flow diagram illustrating certain steps in an embodiment of a method of making a MEMS device comprising an active matrix element and an interferometric modulator.

As shown in FIGS. 19 and 20, active matrix elements may be formed over an iMoD over a single substrate. This embodiment may provide advantages over embodiments in which active matrix elements and iMoDs are separately formed. For example, these embodiments can provide strong electrical contact between the active matrix elements and the iMoD.

With reference to FIGS. 19 and 20, the process 1100 begins at step 1105 with the providing of a first substrate. The first substrate may be an iMoD substrate 900.

Figure 20A:
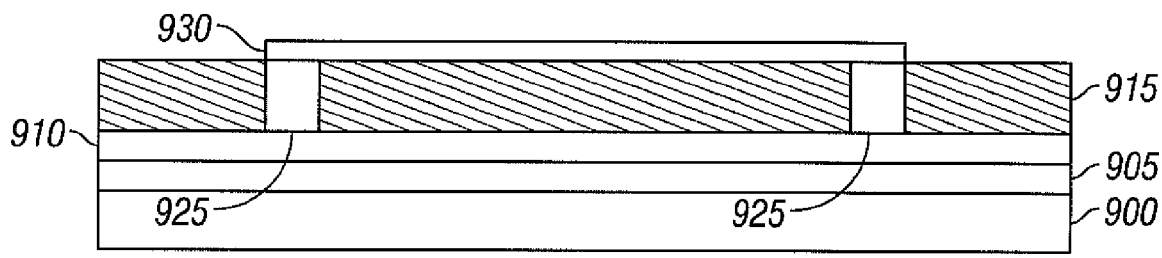
FIGS. 20A through 20H schematically illustrate an embodiment of a method for fabricating a MEMS device comprising an active matrix element and an interferometric modulator.
Figure 20B:
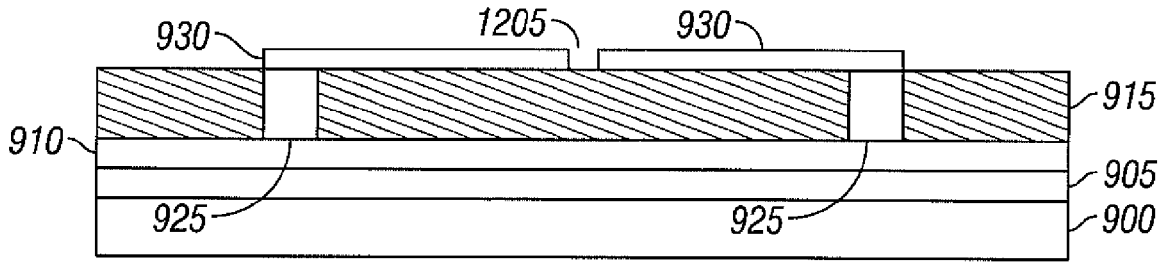

At step 1110, an iMoD 950 is formed. The iMoD 950 may be formed over the iMoD substrate 900. In some embodiments, the sacrificial layer 916 of the iMoD 950 has not been removed, as shown in FIG. 20A. An electrode gap 1205 may be formed in the movable electrode 930 of the iMoD 950, as shown in FIG. 20B.

Figure 20C:
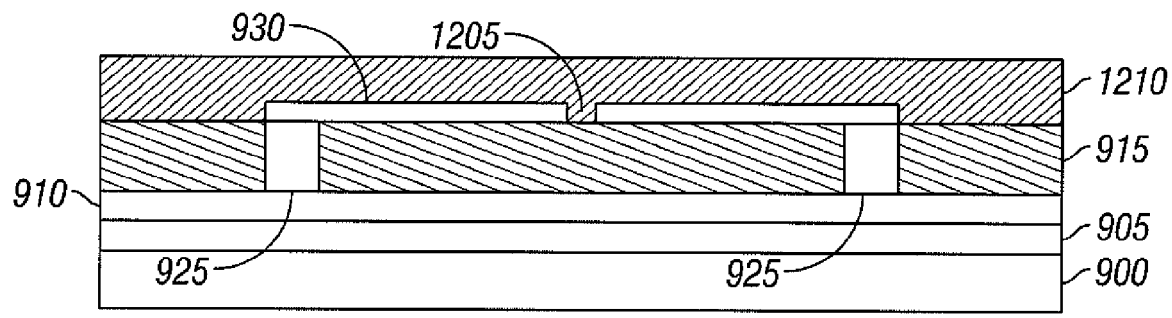
Figure 20D:
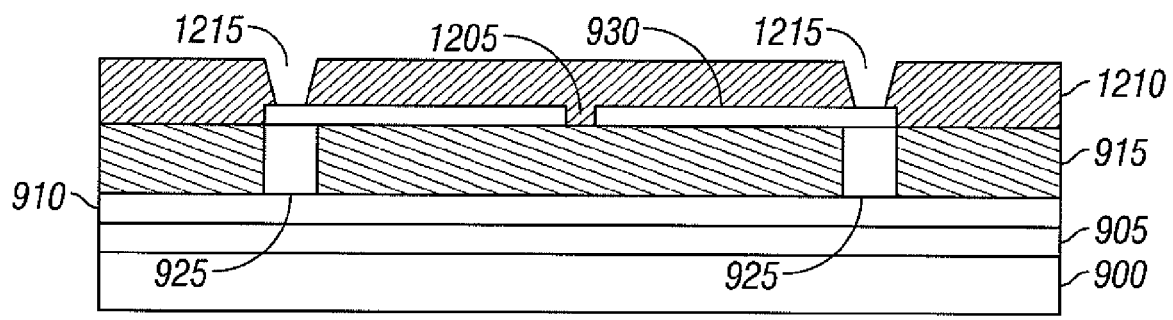
Figure 20E:
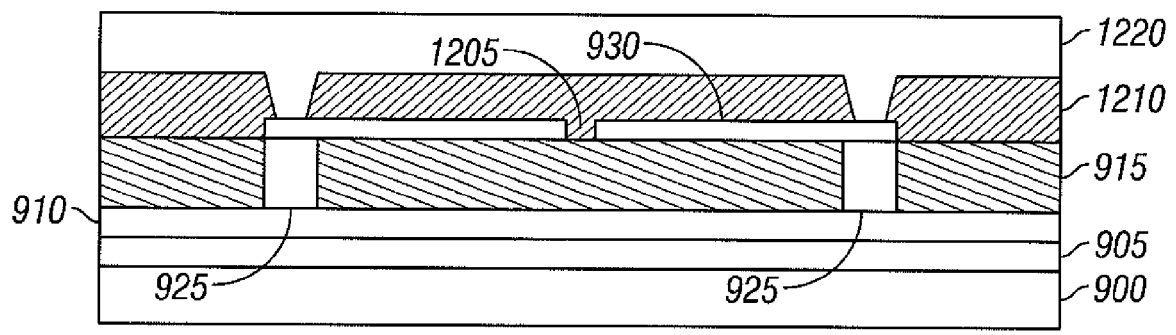

In some embodiments, at step 1115, a second sacrificial layer 1210 is formed over the iMoD 950, as shown in FIG. 20C. The second sacrificial layer 1210 may comprise the same materials as the sacrificial layer 915 of the iMoD 950. In some embodiments, one or more first vias 1215 may be formed in the second sacrificial layer 1210, as shown in FIG. 20D. A planarization layer 1220 may be formed over the second sacrificial layer 1210, as shown in FIG. 20E. The planarization layer 1220 may comprise a polymer with a low dielectric, such as polyimide, acrylic, or BCB (benzocyclobutene). The planarization layer 1220 may fill the one or more first vias 1215.

Figure 20F:
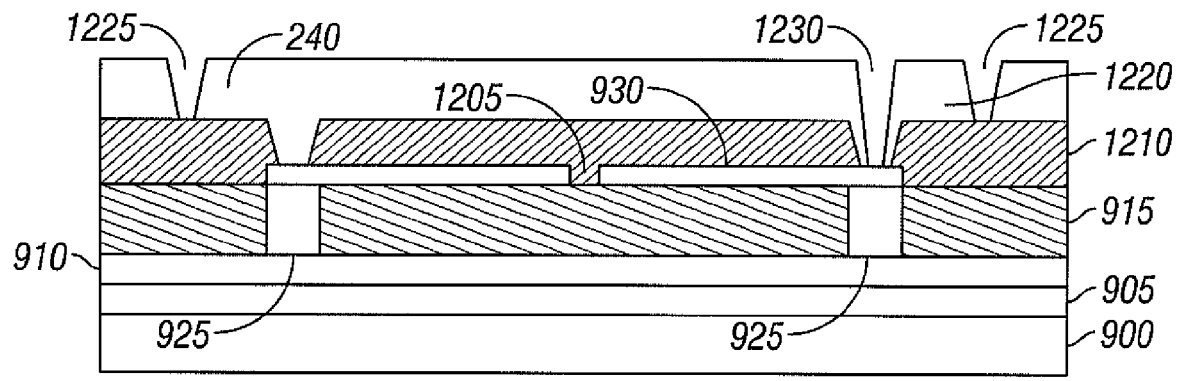
Figure 20G:
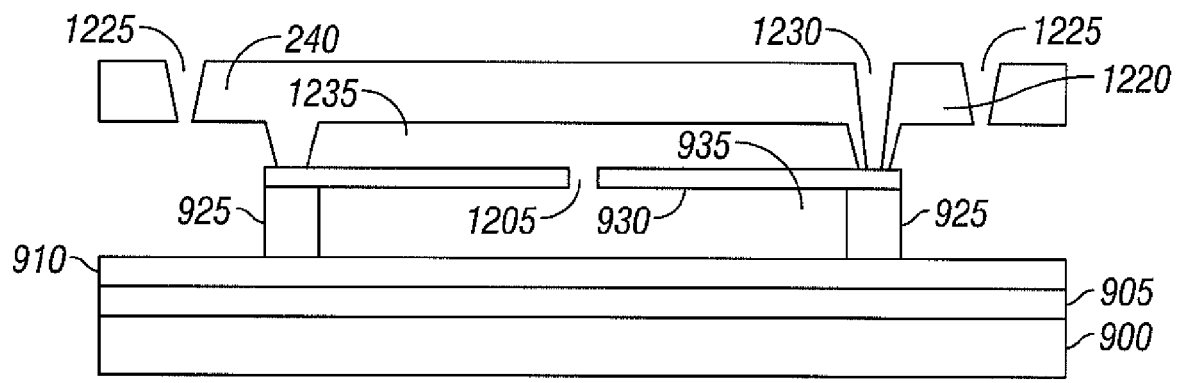

At step 1120, a second via 1230 is formed, as shown in FIG. 20F. The second via 1230 may be in the planarization layer 1220 and may end at the movable second electrode 930. Further, one or more planarization gaps 1225 may be formed in the planarization layer. The planarization gaps 1225 and/or the electrode gap 1205 may allow an etchant to remove the sacrificial layer 915 of the iMoD 950 and the second sacrificial layer 1210. In some embodiments, the sacrificial layer 915 and the second sacrificial layer 1210 are removed to form the iMoD cavity 935 and a second cavity 1235, as shown in FIG. 20G. In some embodiments, the sacrificial layers 915 and 1210 can be removed after the active matrix element 250 is formed.

Figure 20H:
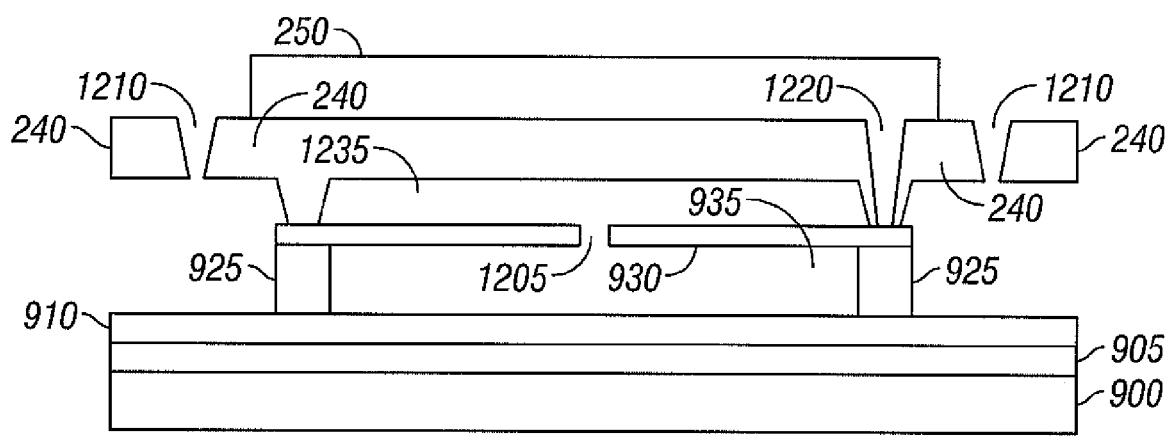

At step 1125, an active matrix element is formed, as shown in FIG. 20H. The active matrix element may be formed over the planarization layer 1220. In some embodiments, the active matrix element 250 may not comprise the passivation layer 240. In some embodiments, a component of the active matrix element extends into the second via 1230 to form an electrical connection with the iMoD 950. For example, a source electrode 225b of the active matrix element 250 may contact the movable electrode 930 of the iMoD 950. In some embodiments, an encapsulation substrate is formed over the active matrix element 250. In some embodiments, a device formed by process 1100 provides strong electrical contact between the active matrix element and the iMoD.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. An interferometric display device, comprising:
 a first substrate;
 a first portion of at least one interferometric modulator configured to modulate incident light formed on the first substrate, the first portion comprising a fixed electrode;
 a second substrate;
 a second portion of the at least one interferometric modulator formed on the second substrate, the second portion comprising a movable electrode;
 at least one control element formed on the second substrate and directly coupled to at least one of the fixed electrode and the movable electrode, the at least one control element comprising one or more of a transistor and an electronic switching element, one wherein the at least one interferometric modulator is disposed between the first substrate and the control element such that the at least one control element is located behind the at least one interferometric modulator with respect to the incident light; and
 at least one support, formed between the first substrate and the second substrate and connecting the first portion and the second portion, the at least one support defining a spacing between the movable electrode and the first portion.

2. The device of claim 1, wherein the first substrate comprises glass and wherein the second substrate comprises silicon.

3. The device of claim 1, wherein the fixed electrode comprises a partially light-reflecting electrode and the movable electrode defines an interferometric cavity with the fixed electrode, and
   wherein the at least one interferometric modulator additionally comprises: at least one first support between the partially light-reflecting electrode and the movable electrode.

4. The device of claim 1, further comprising at least one additional support between the at least one control element and the at least one interferometric modulator.

5. The device of claim 4, wherein the at least one additional support supports the at least one control element behind the at least one interferometric modulator.

6. The device of claim 5, wherein the at least one additional support comprises a flexible component.

7. The device of claim 1, further comprising an electrical connection between the at least one interferometric modulator and the at least one control element.

8. The device of claim 1, wherein the at least one interferometric modulator is characterized by at least two pixel states and wherein the at least one control element at least partially controls the pixel state of the at least one interferometric modulator.

9. The device of claim 1, further comprising at least one color filter configured to modify a color of light emitted from the at least one interferometric modulator.

10. The device of claim 1, further comprising at least one second interferometric modulator configured to selectively modulate incident light, wherein the at least one interferometric modulator and the at least one second interferometric modulator are formed on a first substrate, the first substrate comprising a substantially transparent layer that serves as an electrode in common to the at least one interferometric modulator and the at least one second interferometric modulator.

11. The device of claim 10, wherein the transparent layer is a contiguous non-patterned layer.

12. The device of claim 1, further comprising:
   a display comprising the interferometric display device;
   a processor that is configured to communicate with said display, said processor being configured to process image data; and
   a memory device that is configured to communicate with said processor.

13. The device of claim 12, further comprising a driver circuit configured to send at least one signal to the display.

14. The device of claim 13, further comprising a controller configured to send at least a portion of the image data to the driver circuit.

15. The device of claim 12, further comprising an image source module configured to send said image data to said processor.

16. The device of claim 15, wherein the image source module comprises at least one of a receiver, transceiver, and transmitter.

17. The device of claim 15, further comprising an input device configured to receive input data and to communicate said input data to said processor.

18. A method of manufacturing a display device, comprising:
   forming at least part of an interferometric modulator over a first substrate;
   forming at least part of a control element over a second substrate;
   positioning the at least part of the control element behind the at least part of the interferometric modulator, such that the first and second substrates are substantially parallel to each other;
   forming at least one support between the first and second substrates, wherein the at least one support is formed between a movable electrode of the interferometric modulator and the control element; and
   electrically connecting the at least part of the control element to the at least part of the interferometric modulator.

19. The method of claim 18, wherein the control element comprises a transistor.

20. The method of claim 18, wherein electrically connecting comprises:
   forming a via in the second substrate; and
   forming an electrical connection in the via, the electrical connection coupling the control element and the at least part of the interferometric modulator.

21. The method of claim 18, further comprising operatively attaching the control element to the first substrate.

22. The method of claim 18, further comprising forming an adhesive layer that operatively connects the first substrate to the second substrate.

23. The method of claim 22, wherein the adhesive layer comprises epoxy glue.

24. The method of claim 18, wherein the at least part of the interferometric modulator comprises a light-reflecting electrode, and
   further comprising forming a cavity between the partially light-reflecting electrode of the interferometric modulator and a movable electrode of the interferometric modulator.

25. The method of claim 24, wherein forming the cavity between the partially light-reflecting electrode and the movable electrode comprises removing a sacrificial layer between the partially light-reflecting and movable electrodes.

26. The method of claim 24, wherein the forming the cavity between the partially light-reflecting electrode and the movable electrode comprises supporting the movable electrode with supports over the partially light-reflecting electrode.

27. The method of claim 18 wherein the at least one support comprises a flexible component.

28. A microelectromechanical (MEMS) device fabricated by the method of claim 21.

29. A device comprising:
   a first substrate
   a first portion of means for interferometrically modulating incident light formed on the first substrate, the first portion comprising a fixed electrode
   a second substrate
   a second portion of the means for interferometrically modulating incident light formed on the second substrate, the second portion comprising a movable electrode;
   means for actively controlling the means for interferometrically modulating incident light, formed on the second substrate and directly coupled to at least one of the fixed electrode and the movable electrode, the controlling means comprising one or more of a transistor and an electronic switching element, wherein the means for interferometrically modulating incident light is disposed between the first substrate and the controlling means such that the controlling means is located behind the means for interferometrically modulating incident light with respect to the incident light; and means for supporting the movable electrode, formed between the first substrate and second substrate, connecting the first portion and the second portion, the supporting means defining a spacing between the movable electrode and the first portion.

30. The device of claim 29, wherein the means for actively controlling comprises a means for applying a voltage to the fixed electrode or the movable electrode of the means for interferometrically modulating incident light.

31. A method, comprising:
forming at least a part of an active matrix element over a first substrate;
forming at least a part of an interferometric modulator over a second substrate;
positioning the first substrate behind the second substrate;
attaching the first substrate to the second substrate by forming at least one support therebetween, wherein the at least one support is formed between a movable electrode of the interferometric modulator and the active matrix element; and
at least partially controlling the optical response of an interferometric modulator with the active matrix element.

32. The method of claim 31, wherein the active matrix element comprises a transistor.

33. The method of claim 18, wherein forming at least part of the interferometric modulator over the first substrate comprises forming a partially light-reflecting electrode over the first substrate.

34. The method of claim 33, wherein forming at least part of the interferometric modulator over the first substrate further comprises forming a movable electrode over the partially light-reflecting electrode to form an interferometric cavity.

35. The method of claim 18, further comprising forming at least another part of the interferometric modulator over the second substrate.

36. The method of claim 35, wherein forming the at least another part of the interferometric modulator over the second substrate comprises forming a movable electrode over the at least part of the control element.

37. The method of claim 18, wherein electrically connecting the at least part of the control element to the at least part of the interferometric modulator comprises electrically connecting the at least part of the control element to a movable membrane of the interferometric modulator.

* * * * *

UNITED STATES PATENT AND TRADEMARK OFFICE
CERTIFICATE OF CORRECTION

PATENT NO. : 7,643,199 B2
APPLICATION NO. : 11/765276
DATED : January 5, 2010
INVENTOR(S) : Je-Hsiung Lan It is certified that error appears in the above-identified patent and that said Letters Patent is hereby corrected as shown below:

At Column 9, Line 2, change "RE" to --RF--.

At Column 9, Line 5, change "RE" to --RF--.

At Column 16, Line 23, after "connections" insert --.--.

At Column 20, Line 60, Claim 1, before "wherein" delete "one".

At Column 22, Line 50, Claim 29, after "substrate" insert --;--.

At Column 22, Line 53, Claim 29, after "electrode" insert --;--.

At Column 22, Line 54, Claim 29, after "substrate" insert --;--.

Signed and Sealed this

Seventeenth Day of August, 2010

David J. Kappos
*Director of the United States Patent and Trademark Office*